(12) United States Patent
Ito et al.

(10) Patent No.: US 12,194,365 B2
(45) Date of Patent: Jan. 14, 2025

(54) INFORMATION PROCESSING APPARATUS AND INFORMATION PROCESSING SYSTEM

(71) Applicant: SONY GROUP CORPORATION, Tokyo (JP)

(72) Inventors: Osamu Ito, Tokyo (JP); Takeshi Ogita, Tokyo (JP); Yohei Fukuma, Tokyo (JP); Ikuo Yamano, Tokyo (JP); Ryo Yokoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 394 days.

(21) Appl. No.: 17/602,007

(22) PCT Filed: Mar. 10, 2020

(86) PCT No.: PCT/JP2020/010397
§ 371 (c)(1),
(2) Date: Oct. 7, 2021

(87) PCT Pub. No.: WO2020/213301
PCT Pub. Date: Oct. 22, 2020

(65) Prior Publication Data
US 2022/0152468 A1    May 19, 2022

(30) Foreign Application Priority Data

Apr. 16, 2019    (JP) .................................. 2019-077784

(51) Int. Cl.
*A63B 71/06*    (2006.01)
*A63F 13/00*    (2014.01)
(Continued)

(52) U.S. Cl.
CPC .......... *A63B 71/0619* (2013.01); *G06F 3/013* (2013.01); *G06F 3/14* (2013.01);
(Continued)

(58) Field of Classification Search
CPC .... A63B 71/0619; G06V 40/19; G06F 3/013; G06F 3/14; G06F 3/165; G06T 7/20; G06T 11/00; G06T 2207/30201
See application file for complete search history.

(56) References Cited

U.S. PATENT DOCUMENTS 6,322,451 B1 * 11/2001 Miura .................... A63F 13/795
463/2
8,105,153 B2 * 1/2012 Buecheler ........... G07F 17/3295
463/29
(Continued)

FOREIGN PATENT DOCUMENTS

CN    1835782 A    9/2006
CN    108603739 A    9/2018
(Continued)

OTHER PUBLICATIONS

International Search Report and Written Opinion of PCT Application No. PCT/JP2020/010397, issued on Apr. 21, 2020, 08 pages of ISRWO.

*Primary Examiner* — Milap Shah
(74) *Attorney, Agent, or Firm* — CHIP LAW GROUP

(57) ABSTRACT

Provided is an information processing apparatus including a skill level difference detection unit that detects a skill level difference between a first user and a second user on the basis of sensing data regarding the first user and sensing data regarding the second user having a skill level lower than a skill level of the first user, and a presentation unit that dynamically changes and presents, during performance, skill level difference suppression information that reduces the skill level difference to at least one of the first and second users on the basis of the skill level difference detected. The sensing data is acquired through at least performance and the
(Continued)

like performed by moving at least a part of a body of the users and other performance performed in the past with respect to the performance.

10 Claims, 16 Drawing Sheets

(51) Int. Cl.
*G06F 3/01* (2006.01)
*G06F 3/14* (2006.01)
*G06F 3/16* (2006.01)
*G06T 7/20* (2017.01)
*G06T 11/00* (2006.01)
*G06V 40/19* (2022.01)

(52) U.S. Cl.
CPC ............... *G06F 3/165* (2013.01); *G06T 7/20* (2013.01); *G06T 11/00* (2013.01); *G06V 40/19* (2022.01); *A63B 2071/0677* (2013.01); *G06T 2207/30201* (2013.01)

(56) References Cited

U.S. PATENT DOCUMENTS

| | | | | |
|---|---|---|---|---|
| 9,421,455 | B1* | 8/2016 | Connor | A63F 13/822 |
| 10,632,389 | B1* | 4/2020 | Lu | A63F 13/798 |
| 10,828,572 | B1* | 11/2020 | Kalama | A63G 31/16 |
| 11,351,464 | B2* | 6/2022 | Zhou | G06N 20/00 |
| 11,478,716 | B1* | 10/2022 | Zhao | A63F 13/798 |
| 2005/0010313 | A1 | 1/2005 | Mori | |
| 2008/0268943 | A1* | 10/2008 | Jacob | A63F 13/10 463/43 |
| 2008/0300071 | A1* | 12/2008 | Valaika | G09B 19/0038 473/422 |
| 2010/0113116 | A1* | 5/2010 | Theis | A63F 13/843 463/7 |
| 2016/0067612 | A1* | 3/2016 | Ntoulas | A63F 13/33 463/29 |
| 2017/0252656 | A1* | 9/2017 | Uy, Jr. | A63F 13/35 |
| 2017/0259177 | A1* | 9/2017 | Aghdaie | G06N 7/01 |
| 2018/0266794 | A1 | 9/2018 | Hong | |
| 2019/0329139 | A1* | 10/2019 | Di Giacomo Toledo | A63F 13/67 |
| 2019/0346915 | A1* | 11/2019 | Somareddy | G06F 3/013 |
| 2020/0289943 | A1* | 9/2020 | Rico | A63F 13/795 |
| 2023/0073281 | A1* | 3/2023 | Gazzaley | A63F 13/67 |
| 2023/0230011 | A1* | 7/2023 | Srinivasa | G06F 16/90335 705/322 |
| 2024/0115935 | A1* | 4/2024 | Millson | A63F 13/67 |

FOREIGN PATENT DOCUMENTS

| | | |
|---|---|---|
| JP | 2002-516121 A | 6/2002 |
| JP | 2005-027950 A | 2/2005 |
| JP | 2008-029646 A | 2/2008 |
| JP | 2011-217763 A | 11/2011 |
| JP | 2018-535705 A | 12/2018 |
| KR | 10-2006-0063875 A | 6/2006 |
| KR | 10-1627261 B1 | 6/2016 |
| WO | 1999/044698 A2 | 9/1999 |

* cited by examiner

INFORMATION PROCESSING APPARATUS AND INFORMATION PROCESSING SYSTEM

CROSS REFERENCE TO RELATED APPLICATIONS

This application is a U.S. National Phase of International Patent Application No. PCT/JP2020/010397 filed on Mar. 10, 2020, which claims priority benefit of Japanese Patent Application No. JP 2019-077784 filed in the Japan Patent Office on Apr. 16, 2019. Each of the above-referenced applications is hereby incorporated herein by reference in its entirety.

FIELD

The present disclosure relates to an information processing apparatus and an information processing system.

BACKGROUND

Conventionally, in a case where players (users) having an ability difference (skill level difference) play in individual sports (performance), a handicap may be provided to reduce the ability difference, such as in golf and bowling, so that both players can enjoy competition.

CITATION LIST

Patent Literature

Patent Literature 1: JP 2008-29646 A

SUMMARY

Technical Problem

However, the method of setting a handicap as described above merely affects a win or lose result, and does not change the state of performance itself by directly affecting physical perception of each player (user) to reduce the ability difference (skill level difference).

Therefore, the present disclosure proposes a new and improved information processing apparatus and information processing system that enable users having various skill levels to enjoy competing in performance by directly affecting the physical perception of each user so as to reduce the skill level difference between the users.

Solution to Problem

According to the present disclosure, an information processing apparatus is provided that includes: a skill level difference detection unit configured to detect a skill level difference between a first user and a second user on the basis of sensing data regarding the first user and sensing data regarding the second user having a skill level lower than a skill level of the first user, the sensing data being acquired through at least one of performance performed by moving at least a part of a body of a user and other past performance performed with respect to the performance; and a presentation unit configured to dynamically change and present, during the performance, skill level difference suppression information that reduces the skill level difference to at least one of the first and second users on the basis of the skill level difference detected.

Moreover, according to the present disclosure, an information processing apparatus is provided that includes: a skill level difference detection unit configured to detect a skill level difference between a first group and a second group on the basis of sensing data regarding the first group including a plurality of first users and sensing data regarding the second group including a plurality of second users and having a skill level lower than a skill level of the first group, the sensing data being acquired through at least one of performance performed by moving at least a part of a body of a user and other past performance performed with respect to the performance; and a presentation unit configured to dynamically change and present, during the performance, skill level difference suppression information that reduces the skill level difference to at least one of the first and second groups on the basis of the skill level difference detected.

Furthermore, according to the present disclosure, an information processing system is provided that includes: a skill level difference detection apparatus configured to detect a skill level difference between a first user and a second user on the basis of sensing data regarding the first user and sensing data regarding the second user having a skill level lower than a skill level of the first user, the sensing data being acquired through at least one of performance performed by moving at least a part of a body of a user and other past performance performed with respect to the performance; and a presentation apparatus configured to dynamically change and present, during the performance, skill level difference suppression information that reduces the skill level difference to at least one of the first and second users on the basis of the skill level difference detected.

DESCRIPTION OF EMBODIMENTS

Figure 1:
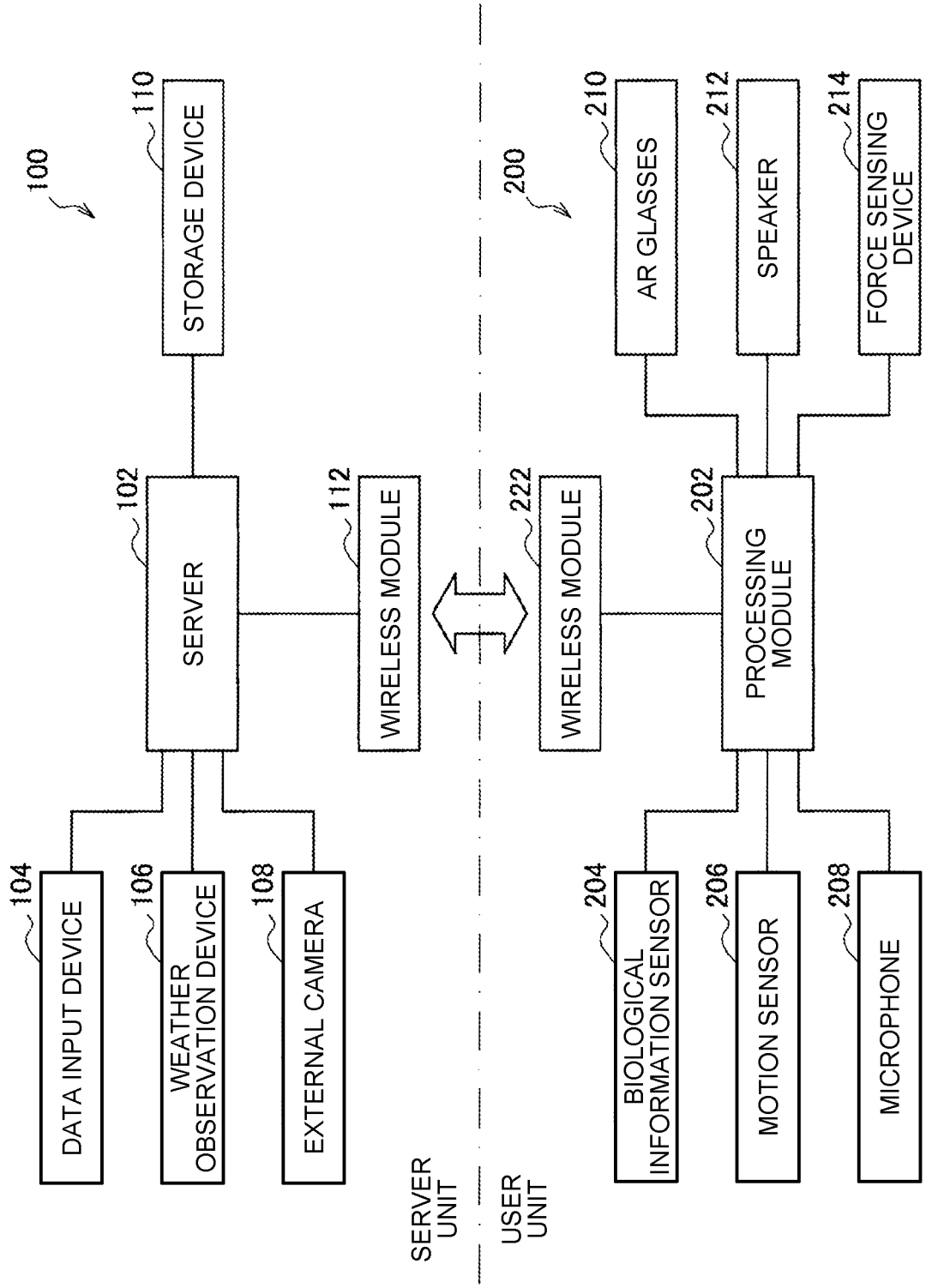
FIG. 1 is an explanatory diagram illustrating a configuration example of an information processing system 10 according to an embodiment of the present disclosure.

Hereinafter, a preferred embodiment of the present disclosure will be described in detail with reference to the accompanying drawings. Note that, in the present specification and the drawings, components having substantially the same functional configuration are denoted by the same reference signs, and redundant description is omitted.

In addition, in the present specification and the drawings, a plurality of components having substantially the same or similar functional configurations may be distinguished by attaching different numbers after the same reference signs. However, in a case where it is not particularly necessary to distinguish each of a plurality of components having substantially the same or similar functional configuration, only the same reference sign is assigned. In addition, similar components in different embodiments may be distinguished by adding different alphabets after the same reference signs. However, in a case where it is not necessary to particularly distinguish each of similar components, only the same reference sign is assigned.

Note that, in the following description, a person who uses a service provided by the embodiment of the present disclosure described later is referred to as a user.

Note that the description will be given in the following order.

1. Background to creation of embodiment according to present disclosure
2. Embodiment
2.1 Overview of information processing system 10 according to embodiment of present disclosure
2.2 Functional configuration of server 102
2.3 Functional configuration of processing module 202
2.4 Information processing method
3. Examples
3.1 Example 1
3.2 Example 2
3.3 Example 3
3.4 Example 4
3.5 Example 5
3.6 Example 6
3.7 Example 7
3.8 Example 8
4. Summary
5. Hardware configuration
6. Supplement

1. BACKGROUND TO CREATION OF EMBODIMENT ACCORDING TO PRESENT DISCLOSURE

First, before describing an embodiment according to the present disclosure, the background to the creation of the embodiment according to the present disclosure by the inventors will be described.

As described above, players (users) having an ability difference (skill level difference) conventionally compete in individual sports (performance) by providing a handicap to reduce the ability difference, such as in golf and bowling, so that both players can enjoy competition. However, the method of setting a handicap as described above merely influences a win or lose result, and does not change the state of performance itself by directly affecting physical perception of each player to reduce the ability difference.

In such circumstances, the present inventors have intensively studied an application that can reduce the difference in ability between players by directly affecting the physical perception itself of each player, so that all people, whether the player is an elderly person, a child, a healthy person, or a disabled person, can enjoy competing in sports, and have created the embodiment of the present disclosure.

Specifically, in the embodiment of the present disclosure created by the present inventors, even when there is a difference in ability between two players in an individual sport, such as Kendo and tennis, the difference in ability can be reduced by providing visual information, tactile information, or the like to both or one of the players, so as to guide the two players to enjoy competition. In addition, in the present embodiment, even in a group sport in which a plurality of players play against each other, it is possible to reduce the difference in ability between both teams by providing visual information or the like to the players, and to guide the players in both teams to enjoy competition. More specifically, in the present embodiment, information that lowers a skill level (skill level difference suppression information) is provided to a player with a high skill level, and information that improves the skill level (skill level difference suppression information) is provided to a player with a low skill level. As a result, the ability difference (skill level difference) as described above can be reduced.

In addition, according to the present embodiment, since the above-mentioned ability difference can be reduced during a sport competition, unlike reducing the ability difference by providing a handicap related to determination of only a win or lose result, both players can enjoy and compete with each other with their own abilities. Furthermore, in the present embodiment, since information that suppresses exhibition of player's actual skill level is provided to a player with a high skill level, a certain load is applied to the player during the game. Therefore, according to the present embodiment, continuing the game under such a load will lead to an improvement of the skill level of the player. Hereinafter, the embodiment of the present disclosure will be described in detail step by step.

In the present specification, performance means a game performed by moving at least a part of user's body, such as sports. Therefore, the performance may include, in addition to sports, board games (chess, Japanese chess, etc.), card games (games of playing cards and Japanese playing cards "Hyakunin-isshu", etc.), video games, and the like in which a hand of the user moves. Furthermore, in the following description, a skill level refers to a degree of proficiency in performance classified or quantified by predetermined grades.

In the following description, a case where the embodiment of the present disclosure is applied to sports will be described as an example. However, as described above, the present embodiment is not limited to sports, and may be applied to various performances such as board games.

2. EMBODIMENT

Figure 2:
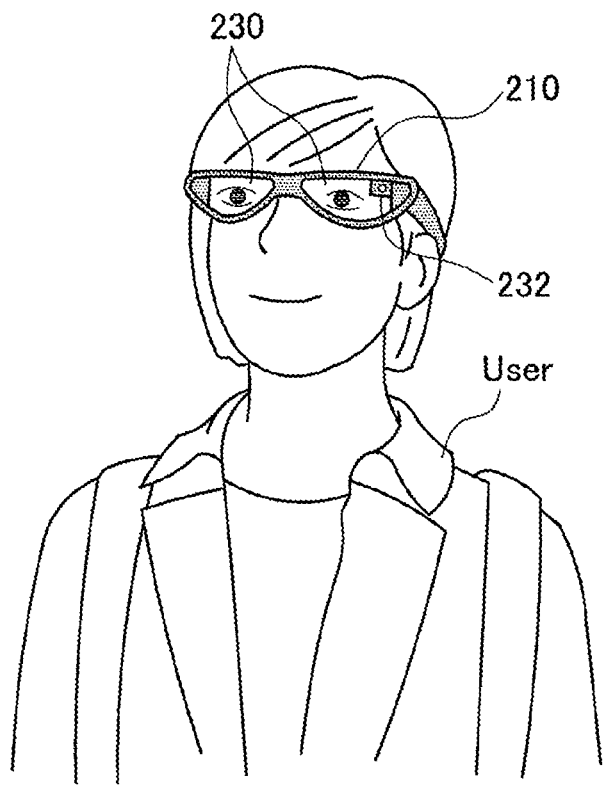
FIG. 2 is an explanatory diagram illustrating an example of an appearance of AR glasses 210 according to the embodiment.

2.1 Overview of Information Processing System 10 According to Embodiment of Present Disclosure First, an overview of an information processing system (information processing apparatus) 10 according to the embodiment of the present disclosure will be described with reference to FIGS. 1 and 2. FIG. 1 is an explanatory diagram illustrating a configuration example of the information processing system 10 according to the present embodiment. FIG. 2 is an explanatory diagram illustrating an example of an appearance of AR glasses 210 according to the present embodiment.

As illustrated in FIG. 1, the information processing system 10 according to the present embodiment can be mainly divided into two blocks that are a server unit 100 and a user unit 200. Specifically, the server unit 100 is installed at a remote place from or in the vicinity of the user, and mainly executes information processing according to the present embodiment. On the other hand, the user unit 200 is provided on the user, and mainly collects sensing data regarding the user and provides information obtained by the above-mentioned information processing to the user. Hereinafter, detailed configurations of the server unit 100 and the user unit 200 according to the present embodiment will be sequentially described.

(Server Unit 100)

As described above, the server unit 100 is installed at a remote place or the like from the user, and mainly executes information processing according to the present embodiment. Specifically, as illustrated in FIG. 1, the server unit 100 mainly includes a server 102, a data input device 104, a weather observation device 106, an external camera 108, a storage device 110, and a wireless module 112. Hereinafter, each device included in the server unit 100 will be described.

Server 102

The server 102 can collect sensing data and the like related to a plurality of users, perform information processing (analysis of performance skill level, state analysis, etc.) according to the present embodiment on the basis of the collected sensing data, and provide information obtained by the information processing to the user unit 200. The server 102 is realized by hardware such as a central processing unit (CPU), a read only memory (ROM), and a random access memory (RAM). Details of the server 102 will be described later.

Data Input Device 104

The data input device 104 is realized by a touch panel, a keyboard, or the like, and receives an input of data and a command to the server 102. For example, the user performs an input operation on the data input device 104, so that the server 102 can acquire a user profile (profile information) that is information regarding the user. The user profile can include, for example, attribute information of the user (age, sex, height, weight, arm length, leg length, eyesight, viewing angle, basic physical ability level (speed of running, endurance, instantaneous force, jumping force, etc.), etc.), a skill level of the user (movement good at and bad at, etc.), information on body conditions of the user. Further, the user profile may include information on a daily schedule (wake-up time, sleeping time, eating time, meal menu, etc.) of the user. Furthermore, in a case where a plurality of users is divided into several groups (teams), the user profile may also include information on a group to which each user belongs.

Weather Observation Device 106

The weather observation device 106 is realized by a temperature sensor, an atmospheric pressure sensor, a humidity sensor, a wind direction and speed sensor, a sunshine sensor, a precipitation sensor, and the like. The weather observation device 106 acquires weather information and the like as information regarding the surrounding environment of the user (surrounding environment information) and outputs the information to the server 102. Furthermore, the weather observation device 106 may include an oxygen concentration sensor that measures oxygen concentration in the surrounding environment.

External Camera 108

The external camera 108 is realized by, for example, an imaging unit (not illustrated) that condenses light emitted from a target space to form an optical image on an imaging surface and converts the optical image formed on the imaging surface into an electrical image signal to acquire an image (for example, configured with an imaging optical system such as an imaging lens and a zoom lens that condenses light emitted from a subject, an imaging element such as a charge coupled device (CCD) or a complementary metal oxide semiconductor (CMOS), and the like), and a recording unit (not illustrated) that stores the captured image (moving and still images). The external camera 108 may capture an image for analyzing a condition of a ground or the like where the user is located (wet, lawn growth condition, surface roughness, etc.) as information regarding the surrounding environment of the user (surrounding environment information), and output the captured image to the server 102. Furthermore, the external camera 108 may function as a camera that captures a moving image for detecting movement (trajectory) of a ball, a racket, a club, or the like.

Furthermore, in the present embodiment, the server unit 100 may be provided with a time of flight (TOF) sensor (not illustrated) in addition to the weather observation device 106 and the external camera 108. Specifically, in the present embodiment, by measuring return time of reflected light from a real object using the TOF sensor, shape information (depth information) such as a distance between the TOF sensor and the real object and roughness can be recognized.

Storage Device 110

The storage device 110 is realized by a RAM, a storage device, or the like, and stores an information processing program and various databases according to the present embodiment. In addition, the storage device 110 may appropriately store various parameters that need to be stored when a certain process is performed, a progress of processes, and the like, in addition to these pieces of data.

Wireless Module 112

The wireless module 112 is an interface with the user unit 200, and is realized by a communication device such as a communication antenna, a transmission/reception circuit, a port, and the like. Specifically, the wireless module 112 is communicably connected to a device included in the user unit 200 via a wireless communication network (not illustrated) such as a wireless local area network (LAN), Wi-Fi (registered trademark), or Bluetooth (registered trademark). In the present embodiment, as a communication system used in the wireless communication network, an arbitrary system can be applied, but it is desirable to use a communication system capable of maintaining a stable operation.

Furthermore, in the present embodiment, the server unit 100 may further include a microphone (not illustrated) that collects sound around the user, but is not particularly limited thereto.

(User Unit 200)

As described above, the server unit 100 is provided on the user side, mainly collects sensing data regarding the user, and provides information obtained by information processing according to the present embodiment to the user. Specifically, as illustrated in FIG. 1, the user unit 200 mainly includes a processing module 202, a biological information sensor 204, a motion sensor 206, a microphone (hereinafter, referred to as a microphone) 208, augmented reality (AR) glasses 210, a speaker 212, a force sensing device 214, and a wireless module 222. Each device included in the user unit 200 will be described below.

Some or all of the devices included in the user unit 200 can be a wearable device that can be worn on a part of the user's body (earlobe, neck, arm, wrist, ankle, etc.) or an implant device inserted into the user's body. More specifically, the wearable device can be various types of wearable devices such as a head mounted display (HMD) type, a spectacle type, an ear device type, an anklet type, a bracelet (wristband) type, a collar type, an eyewear type, a pad type, a batch type, and a clothing type. Further, some or all of the devices included in the user unit 200 may be provided on a tool (racket, bat, etc.) that the user uses. Furthermore, some or all of the devices included in the user unit 200 may be devices installed around the user.

Processing Module 202

The processing module 202 can collect sensing data from various sensors (biological information sensor 204, motion sensor 206, and microphone 208) acquired through performance (including past performance as well as current performance), and provide the sensing data to the server unit 100. Furthermore, the processing module 202 can output information obtained from the server unit 100 to the user via various output devices (AR glasses 210, speaker 212, and force sensing device 214). Specifically, the processing module 202 may be realized by hardware such as a CPU, a ROM, and a RAM, may include a built-in clock mechanism (not illustrated) that identifies an accurate time, and may associate the time when the sensing data is acquired with the sensing data acquired from various sensors. Note that details of the processing module 202 will be described later.

Biological Information Sensor 204

The biological information sensor 204 is realized by, for example, biological information sensors such as a myoelectric sensor, a heart rate sensor, a pulse sensor (a blood flow sensor (including a blood pressure sensor), a respiration sensor, an electroencephalogram sensor, a skin temperature sensor, a skin conductivity sensor, and a perspiration sensor, and acquires sensing data related to biological information of the user.

For example, the myoelectric sensor can quantitatively detect an amount of muscle activity by measuring, using a plurality of electrodes worn on user's arm or the like, a myoelectric potential of an electric signal generated in a muscle fiber when the muscle such as of an arm contracts and propagates on a body surface. Still more, the heart rate sensor is a sensor that detects a heart rate that is a heartbeat in the heart of the user. Still more, the pulse sensor is a sensor that detects a pulse that is a pulsation of an artery appearing on a body surface or the like when blood is sent to the whole body through the artery by pulsation (heartbeat) in the heart to cause a change in pressure on an inner wall of the artery. Furthermore, the blood flow sensor is a sensor that detects a blood flow by reflection of the infrared light emitted to the body.

The breathing sensor can also be a breathing flow meter that detects changes in a breathing volume. An electroencephalogram sensor is a sensor that detects an electroencephalogram by placing a plurality of electrodes on user's scalp and removing noise from fluctuation of a measured potential difference between the electrodes to extract periodic waves. The skin temperature sensor is a sensor that detects user's body temperature, and the skin conductivity sensor is a sensor that detects user's skin electrical resistance. The perspiration sensor is a sensor that is placed on the skin of the user and detects a voltage or resistance between two points on the skin that changes due to perspiration.

Furthermore, the biological information sensor 204 may be realized by an imaging device (second imaging device) that images facial expression and both eyes of the user as an imaging range, and may include an eye direction sensor that detects user's eyeball positions, pupil positions, direction of eyes, eyeball movement (motion of eyeballs), and the like. For example, the imaging device may be provided in the AR glasses 210 described later.

Motion Sensor 206

The motion sensor 206 can acquire sensing data indicating a state of each motion element performed by each part of the user's body (amount of physical activity, foam, etc.) and a posture of the user by, for example, placing the motion sensor 206 on a part of the user's body or on a tool that the user uses. For example, the motion sensor 206 is realized by one or a plurality of sensor devices such as a triaxial acceleration sensor, a triaxial angular velocity sensor, a gyro sensor, a geomagnetic sensor, a position sensor, a vibration sensor, and a bending sensor, and can function as a posture sensor that detects not only the state of each motion element performed by each part of the user's body but also a posture of the user. The sensor device as described above detects a change in acceleration, angular velocity, or the like given by the motion element, and generates a plurality of pieces of sensing data indicating a detected change. Further, the sensing data obtained by the motion sensor 206 is output to the processing module 202.

Here, note that the bending sensor is, for example, a sensor using an element whose resistance value changes nonlinearly according to a bending amount when bent, and can detect a bending angle of a joint by placing the bending sensor, for example, on the user's joint. In the present embodiment, by placing the sensor devices as described above on each joint or the like such as of an arm, a leg, or a torso of the user, it is possible to quantitatively detect the posture (inclination) of a finger or arm in the space, a moving speed, a bending angle of the joint, and the like.

Furthermore, in the present embodiment, the motion sensor 206 may be an imaging device (first imaging device) that images the user. Specifically, a marker including a light emitting diode (LED) may be placed on a joint, a finger, or the like of the user, and movement of the marker may be captured by a high-speed imaging camera (imaging device) to quantitatively detect the position and movement of the user's joint. Furthermore, such an imaging device may function as a camera that captures a moving image for detecting movement (trajectory) of a ball, a racket, a club, or the like that the user uses.

Microphone 208

The microphone 208 is realized by a sound sensor that detects a user's utterance sound or a sound generated around the user (cheer, etc.). Furthermore, in the present embodiment, an extraction result obtained by extracting a specific sound (for example, specific words uttered by the user) from the sound detected by the microphone 208 may be used as the sensing data. Note that the microphone 208 may be provided in the AR glasses 210 described later.

AR Glasses 210

The AR glasses 210 are an example of a display device in the present embodiment, and can display the skill level difference suppression information described later in the form of visual information. Specifically, as illustrated in FIG. 2, the AR glasses 210 are realized by, for example, spectacle-type HMD worn on the head of the user. Specifically, a display part 230 corresponding to a spectacle lens part located in front of the eyes of the user when worn may be a transmissive display that the outside of the spectacle lens part can be visually recognized, or a non-transmissive display that the outside of the spectacle lens part cannot be visually recognized. Note that, in the following description, the HMD having the display part 230 of the transmissive display is referred to as "smart eyeglasses".

The AR glasses 210 can provide a virtual object in front of the eyes of the user by displaying the virtual object on the display part 230. Note that, in the following description, the virtual object means a virtual object that can be perceived by a user as a real object existing in a real space. Furthermore, in the present embodiment, the HMD is not limited to a mode of displaying the virtual object for both eyes of the user, and may have a mode of displaying the virtual object only for one eye of the user.

For example, a case where the AR glasses 210 are smart eyeglasses will be described as an example. As illustrated in FIG. 2, the AR glasses 210 have a configuration in which a pair of display parts 230 for left eye and right eye are arranged in front of the eyes of the user. Then, for example, the transmissive display is used for the display parts 230, and the processing module 202 capable of controlling the display parts 230 can set the display to a through state, i.e., a transparent or translucent state by controlling transmittance of the transmissive display. Furthermore, since the display part 230 is in the through state, even in a case where the AR glasses 210 are always worn like glasses, the user can perceive the surrounding real space, and thus does not interfere with the user's normal life. Furthermore, the display parts 230 can display an image such as text or a diagram in the through state. In other words, the display parts 230 can display a virtual object as augmented reality (AR) by superimposing the virtual object on the real space. Such a transmissive display uses, for example, a half mirror or a transparent light guide plate to hold a virtual image optical system including a transparent light guide unit or the like in front of the user's eyes and displays a virtual object inside the virtual image optical system.

Note that, in the present embodiment, in a case where the non-transmissive display is used, the display parts 230 may superimpose and display the virtual object on the captured image of the real space while displaying the captured image of the real space taken by an outward camera 232 provided in the AR glasses 210.

Furthermore, in the present embodiment, the display part 230 may be realized as a light emitting diode (LED) light source or the like that directly projects an image onto a retina of the user. In other words, the AR glasses 210 may be realized as a projection type HMD.

Note that, in the present embodiment, a style of the AR glasses 210 is not limited to the example illustrated in FIG. 2, and may be, for example, a headband type HMD or a helmet type HMD (for example, a visor part of the helmet corresponds to the display). Also note that the above-described headband type means a type worn with a band that goes around the entire circumference of the user's head. Furthermore, the headband type includes a band passing across a parietal region, in addition to a temporal region, of the user's head.

Speaker 212

The speaker 212 is an example of an audio output device in the present embodiment, and can output the skill level difference suppression information described later in the form of auditory information. Specifically, the speaker 212 is a device for outputting sound to the user, and may be, for example, a headphone speaker (not illustrated) worn on the user's ears or a speaker (not illustrated) provided in the vicinity of the user. Furthermore, in the present embodiment, the speaker 212 may be a directional speaker installed around the user that provides individual sound (for example, sound information optimized for each user) to one or both of the two users or some or all of the plurality of users.

Force Sensing Device 214

The force sensing device 214 is an example of a force (tactile) sensing device in the present embodiment, and can provide (output) the skill level difference suppression information to be described later in the form of force (tactile) sensing information. Specifically, the force sensing device 214 is a device that transmits force such as by applying a force to a part (joint or the like) of the user's body according to the control by the processing module 202. For example, the force sensing device 214 can be a glove-type wearable device worn on the hand of the user. Specifically, the glove-type wearable device is called a finger exoskeleton robot, and includes a mechanism (not illustrated) including a plurality of exoskeleton members, and an actuator (electric actuator, pneumatic actuator, etc.) (not illustrated) that moves each exoskeleton member. The glove-type wearable device applies a force to the user's fingers and joints by operating the exoskeleton member by the actuator.

Furthermore, in the present embodiment, the force sensing device 214 is not limited to the glove-type wearable device as described above, and may be, for example, a vibration device that applies vibration to a part of the user's body or a tool used by the user to suppress smooth action of the user or make the user have motion sickness. Furthermore, for example, the force sensing device 214 may be a stimulation device using electric muscle stimulation that stimulates muscle of the user. In other words, in the present embodiment, the force sensing device 214 is not particularly limited as long as it is a device capable of giving a tactile stimulation to a part of the user's body.

Wireless Module 222

The wireless module 222 is an interface with the server unit 100, and is realized by a communication device such as a communication antenna, a transmission/reception circuit, and a port. Specifically, the wireless module 222 is communicably connected to a device included in the server unit 100 via a wireless communication network (not illustrated) such as a wireless LAN, Wi-Fi (registered trademark), or Bluetooth (registered trademark).

Further, the user unit 200 may include a positioning sensor (position sensor) (not illustrated) that detects user position information. The positioning sensor is a sensor that is placed on the user to detect the position of the user. Specifically, the position sensor can be a global navigation satellite system (GNSS) receiver or the like. In this case, the positioning sensor can generate sensing data indicating a latitude and longitude of the current location of the user on the basis of a signal from a GNSS satellite. In addition, in the present embodiment, since it is possible to detect a relative positional relationship of the user from, for example, radio frequency identification (RFID), an access point of Wi-Fi, information on a radio base station, and the like, it is also possible to use these communication devices as the positioning sensor.

Furthermore, the user unit 200 may include a pressure sensor or the like provided on a tool (racket, etc.) that the user uses.

Note that, in the present embodiment, the server 102 of the server unit 100 and the processing module 202 of the user unit 200 may be configured as an integrated device. In such a case, the integrated device is connected to other devices included in the server unit 100 and the user unit 200 via wireless communication.

2.2 Functional Configuration of Server 102>

Figure 3:
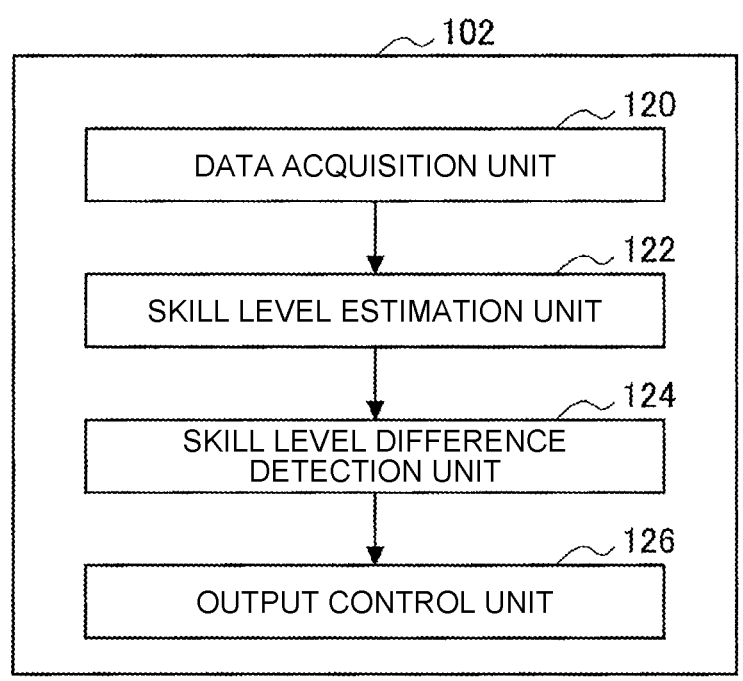
FIG. 3 is a block diagram illustrating a functional configuration of a server 102 according to the embodiment.

The overview of the information processing system 10 according to the present embodiment has been described above. Next, an example of a functional configuration of the server 102 according to the present embodiment will be described with reference to FIG. 3. FIG. 3 is a block diagram illustrating the functional configuration of the server 102 according to the present embodiment. As illustrated in FIG. 3, the server 102 according to the present embodiment mainly includes, for example, a data acquisition unit 120, a skill level estimation unit 122, a skill level difference detection unit 124, and an output control unit 126. Hereinafter, details of each functional unit of the server 102 according to the present embodiment will be described.

(Data Acquisition Unit 120)

The data acquisition unit 120 acquires information such as the user profile, the weather information, and the surrounding environment information from the data input device 104, the weather observation device 106, the external camera 108, and the like described above, and outputs the acquired information to the skill level estimation unit 122 described later. In addition, the data acquisition unit 120 acquires sensing data from various sensors (biological information sensor 204, motion sensor 206, and microphone 208) in the user unit 200, and outputs the acquired sensing data to the skill level estimation unit 122.

(Skill Level Estimation Unit 122)

The skill level estimation unit 122 estimates a skill level of each user on the basis of various types of information (user profile, etc.) and various types of sensing data output from the data acquisition unit 120, and outputs an estimation result to the skill level difference detection unit 124 described later. Note that, in the present embodiment, the estimated skill level may be provided to the user, and by doing so, the user can recognize his/her skill level.

Specifically, in the present embodiment, for example, a type of sensing data related to a motion element that is important for performing a task given to a user (for example, sports) is identified in advance, and a relationship between applicable type of sensing data and a skill level is stored in a database in advance. Then, the skill level estimation unit 122 may estimate the skill level of the user by comparing the database with newly acquired sensing data of the user.

Furthermore, in the present embodiment, a plurality of pieces of sensing data of users at various skill levels, information on corresponding skill levels, and the like may be input to a learner provided in the server 102, and the learner may implement machine learning in advance. Specifically, for example, it is assumed that the server 102 includes a supervised learner such as a support vector regression or a deep neural network. Then, by inputting the sensing data and the skill level to the learner as an input signal and a supervised signal (label), respectively, the learner can perform machine learning on the relationship between these pieces of information according to a predetermined rule, and can create database of the relationship between the sensing data and the skill level in advance. Then, the skill level estimation unit 122 may estimate the skill level of the user on the basis of the database and the newly acquired sensing data of the user. Note that the learner may implement machine learning by a semi-supervised, weakly supervised learner or the like.

In the present embodiment, the machine learning as described above can also be used when generating the skill level difference suppression information in the output control unit 126 described later. For example, by creating a database of the relationship between the skill level of the user and the skill level difference suppression information by machine learning, the relationship can be used when generating information for raising the skill level (skill level improvement guidance information) or information for lowering the skill level (skill level reduction guidance information). Furthermore, in the present embodiment, the machine learning as described above may be used to estimate a trajectory of the ball, a next attack motion, a suitable motion, and the like.

(Skill Level Difference Detection Unit 124)

The skill level difference detection unit 124 detects a difference in skill level (skill level difference) among a plurality of users on the basis of the estimation result output from the skill level estimation unit 122 described above, and outputs the detection result to the output control unit 126 described later. For example, in a specific performance (sport, etc.), it is assumed that the skill level of the user A (first user) is 5 out of 5 levels (here, the greater the number, the higher the degree of proficiency), and the skill level of the user B (second user) is 2. In such a case, the skill level difference detection unit 124 assumes that the skill level difference between the user A and the user B is 3, and outputs the skill level difference to the output control unit 126 described later. In the present embodiment, not only the value of the skill level difference but also the skill levels of the user A and the user B are output to the output control unit 126. In this way, the output control unit 126 described later can output a difference in skill level between the user A and the user B and suitable skill level difference suppression information corresponding to each skill level. Furthermore, in the present embodiment, the detected skill level difference may be presented to the user, and in this manner, the user can recognize the skill level difference.

(Output Control Unit 126)

Based on the skill level difference detected by the skill level difference detection unit 124 described above, the output control unit 126 dynamically changes the skill level difference suppression information for reducing the skill level difference during the performance of the user, and outputs the skill level difference suppression information to the processing module 202. The skill level difference suppression information is, for example, information for reducing the skill level difference between the user A and the user B in a case where two users are competing with each other. For example, the skill level difference suppression information can be the skill level reduction guidance information that guides the user A having a high skill level to lower the skill level. Specifically, this information is provided to the user A to hinder the motion of the user A during performance. Furthermore, for example, the skill level difference suppression information can be skill level improvement guidance information that guides the user B having a low skill level to improve the skill level. Specifically, this information is provided to the user B to improve the accuracy, speed, and the like of the motion of the user B during performance. Note that the skill level difference suppression information includes not only information to be provided (output) but also information such as to which user at what timing and by what means to output the information. In the present embodiment, by doing so, it is possible to provide the skill level difference suppression information to the user at a suitable timing by means corresponding to a more suitable sensory modality, and thus it is possible to more effectively reduce the skill level difference between the users. Furthermore, the output control unit 126 may dynamically change information to be output (for example, display of virtual object) according to the skill level difference suppression information that changes during performance (play). Furthermore, the output control unit 126 may acquire information such as the user profile, weather information, and ambient environment information from the data input device 104, the weather observation device 106, the external camera 108, and the like described above, and generate the skill level difference suppression information on the basis of the acquired information. Furthermore, the output control unit 126 may also output the skill level of the user, a result of situation analysis on performance (play), and the like to the processing module 202 to provide them to the user.

2.3 Functional Configuration of Processing Module 202

Figure 4:
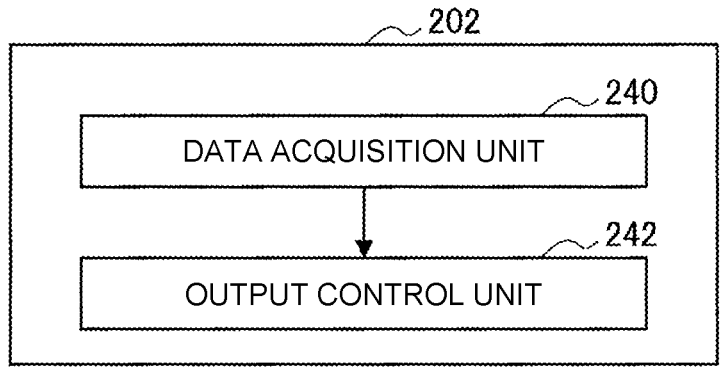
FIG. 4 is a block diagram illustrating a functional configuration of a processing module 202 according to the embodiment.

An example of the functional configuration of the server 102 according to the present embodiment has been described above. Next, an example of a functional configuration of the processing module 202 according to the present embodiment will be described with reference to FIG. 4. FIG. 4 is a block diagram illustrating a functional configuration of the processing module 202 according to the present embodiment. As illustrated in FIG. 4, the processing module 202 according to the present embodiment mainly includes, for example, a data acquisition unit 240 and an output control unit (presentation unit) 242. Hereinafter, details of each functional unit of the processing module 202 according to the present embodiment will be described.
(Data Acquisition Unit 240)

The data acquisition unit 240 acquires sensing data from the biological information sensor 204, the motion sensor 206, the microphone 208, and the like, and outputs the acquired sensing data to the server 102 described above. In addition, the data acquisition unit 240 acquires the skill level difference suppression information from the server 102 described above, and outputs the skill level difference suppression information to the output control unit 242 described later.
(Output Control Unit 242)

The output control unit 242 controls a means corresponding to any suitable sensory modality of the AR glasses 210, the speaker 212, or the force sensing device 214 described above on the basis of the skill level difference suppression information described above, and dynamically changes and provides the skill level difference suppression information to at least one of the plurality of users during the performance of the user.

2.4 Information Processing Method

Figure 5:
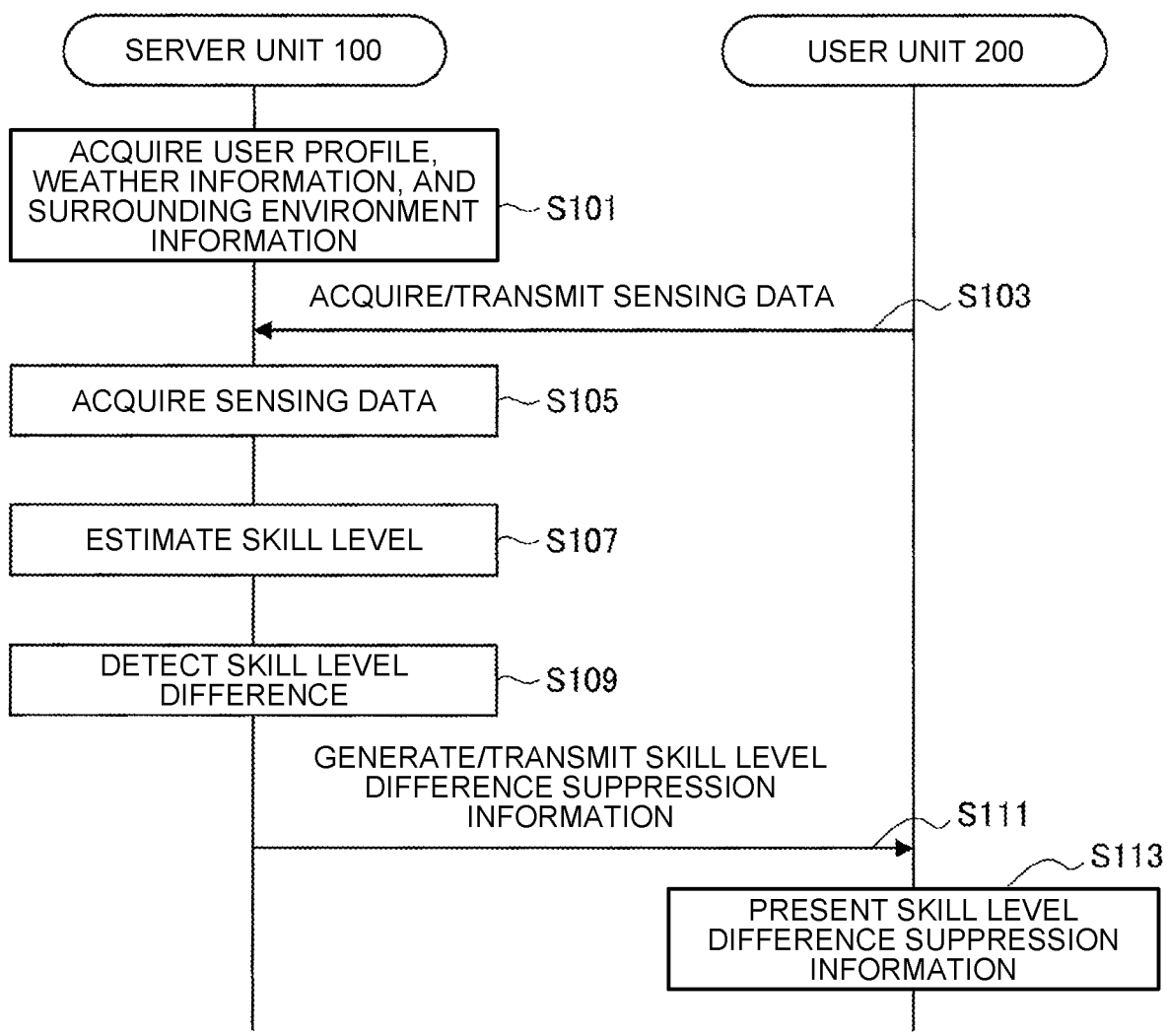
FIG. 5 is a sequence diagram illustrating an example of an information processing method according to the embodiment.

The information processing system 10 according to the present embodiment and the configuration of each device included in the information processing system 10 have been described in detail above. Next, an information processing method according to the present embodiment will be described with reference to FIG. 5. FIG. 5 is a sequence diagram illustrating an example of the information processing method according to the present embodiment. As illustrated in FIG. 5, the information processing method according to the present embodiment includes a plurality of steps from Step S101 to Step S113. Hereinafter, details of each step included in the information processing method according to the present embodiment will be described.
(Step S101)

The server unit 100 acquires information such as the user profile, weather information, and surrounding environment information.
(Step S103)

The user unit 200 acquires various types of sensing data and transmits the acquired various types of sensing data to the server unit 100 described above.
(Step S105)

The user unit 200 acquires various types of sensing data.
(Step S107)

The server unit 100 estimates the skill level of each user on the basis of various types of information (user profile, etc.) and various types of sensing data.
(Step S109)

The server unit 100 detects a skill level difference between the plurality of users on the basis of the skill level of each user estimated in Step S107 described above. For example, in a case where two users are competing with each other, the skill level difference between the user A and the user B is detected.
(Step S111)

The server unit 100 generates the skill level difference suppression information on the basis of the skill level difference detected in Step S109 described above, and transmits the skill level difference suppression information to the user unit 200. Here, the server unit 100 may generate the skill level difference suppression information on the basis of the information such as the user profile, the weather information, and the surrounding environment information acquired in Step S101 described above. For example, the server unit 100 may change the content of the skill level difference suppression information according to the characteristic information (easily get motion sickness, lack of concentration, nervous, etc.) of the user included in the user profile.
(Step S113)

The user unit 200 controls means corresponding to any suitable sensory modality of the AR glasses 210, the speaker 212, or the force sensing device 214 described above on the basis of the skill level difference suppression information described above, and provides the skill level difference suppression information to at least one of the plurality of users via these means. Here, the user unit 200 may combine or switch a plurality of means according to the skill level difference suppression information. Furthermore, the user unit 200 preferably provides the skill level difference suppression information to the user at an effective timing on the basis of the skill level difference suppression information described above.

According to the present embodiment, since it is possible to reduce the skill level difference between the users by directly affecting user's physical perception, the users having various skill levels can enjoy competing in sports.

Note that, in the present embodiment, the skill level difference between the plurality of users also changes according to the skill level of each user that changes during the performance of the plurality of users. Therefore, in the present embodiment, since the skill level difference changes, the skill level difference suppression information provided to the user also dynamically changes.

Furthermore, in the present embodiment, by repeating the sequence illustrated in FIG. 5 during performance of the user and implementing machine learning, feedback, and the like, it is possible to reduce a difference in skill level among a plurality of users.

3. EXAMPLES ACCORDING TO EMBODIMENT OF PRESENT DISCLOSURE

The details of the information processing method according to the embodiment of the present disclosure have been described above. Next, examples of information processing according to the embodiment of the present disclosure will be described in more details with reference to specific examples. Note that the following examples are merely examples of the embodiment of the present disclosure, and the embodiment of the present disclosure is not limited to the following examples.

3.1 Example 1

Figure 6:
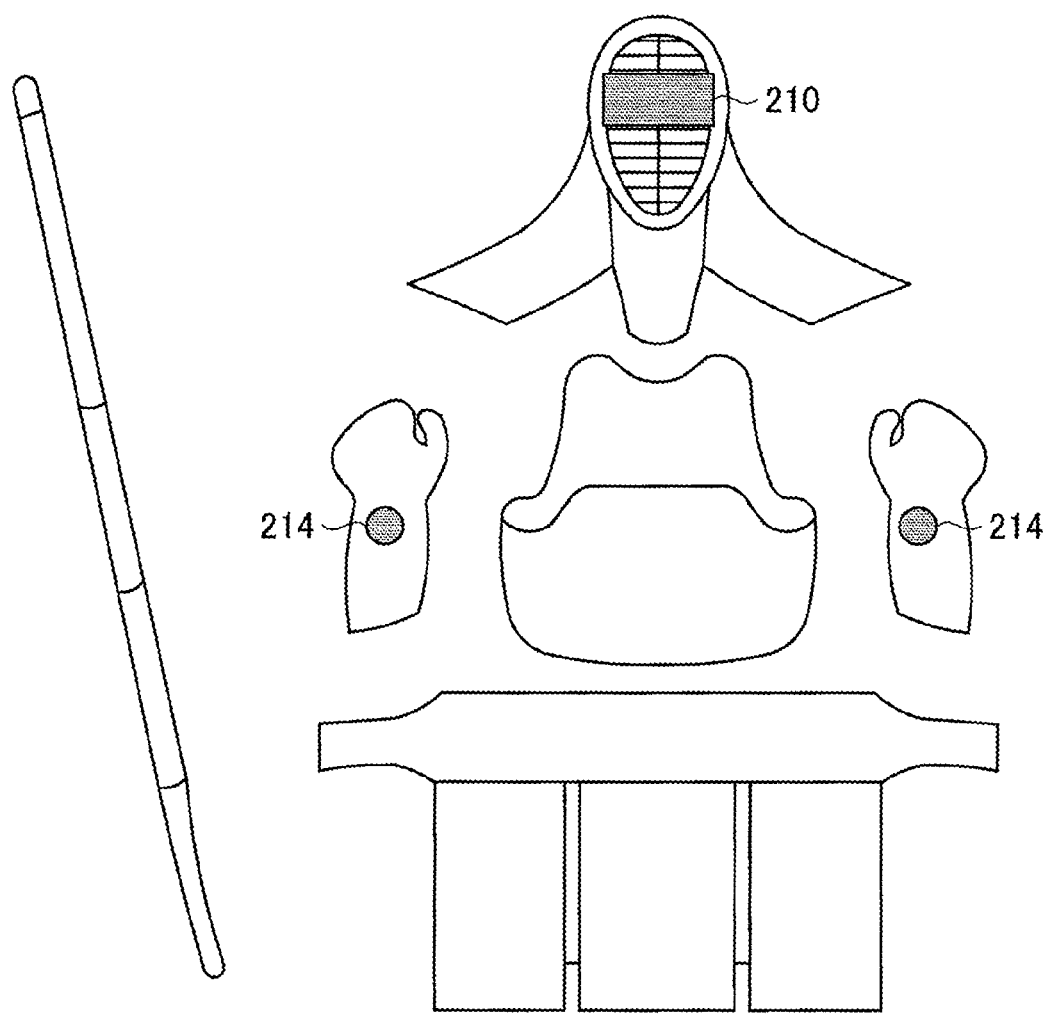
FIG. 6 is an explanatory diagram (part 1) illustrating Example 1 according to the embodiment.
Figure 7:
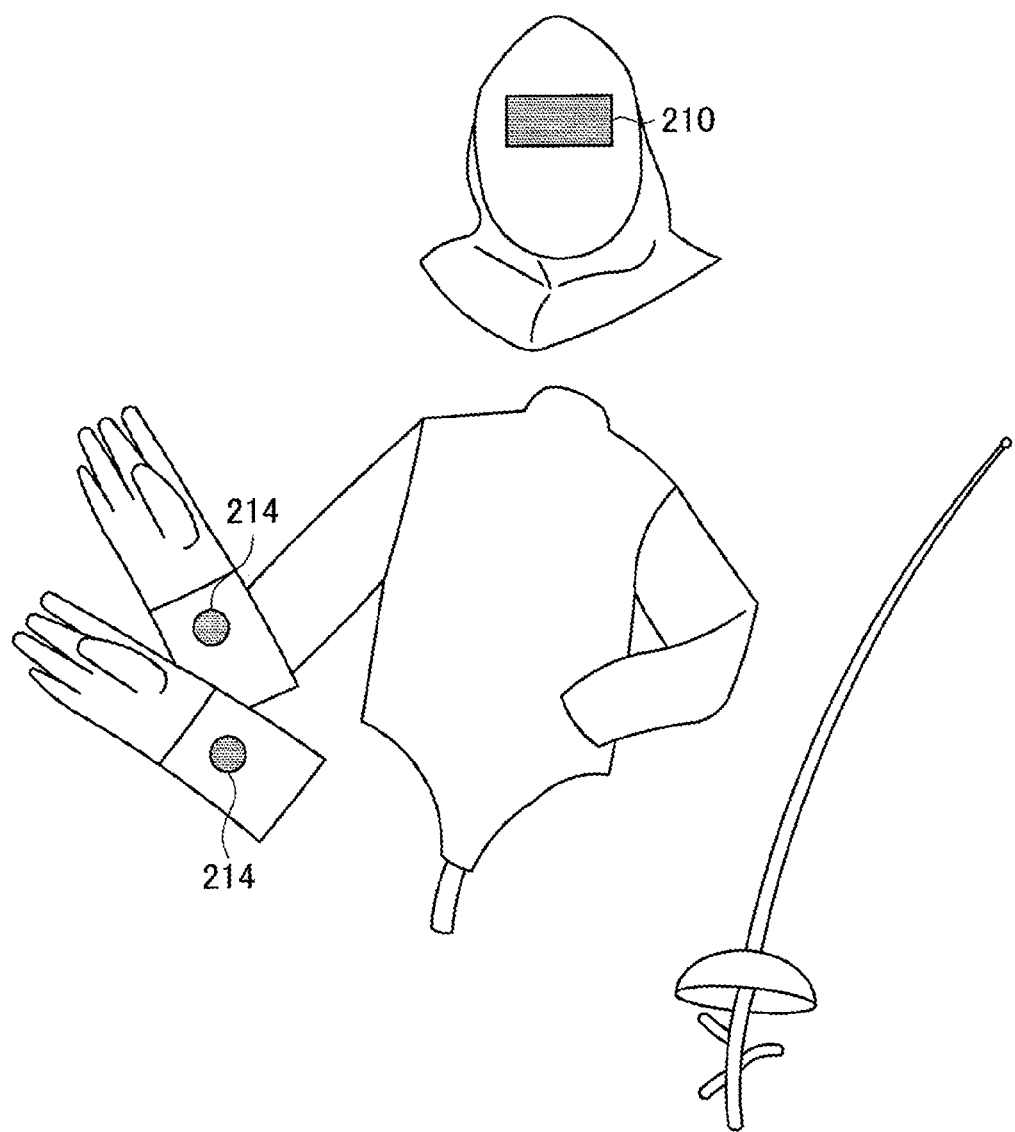
FIG. 7 is an explanatory diagram (part 2) illustrating Example 1 according to the embodiment.

First, as Example 1, an example will be described, with reference to FIGS. 6 and 7, in a case where the above-described embodiment of the present disclosure is applied to kendo or fencing in which two users (user A, user B) play against each other. FIGS. 6 and 7 are explanatory diagrams for explaining Example 1.

For example, in the present embodiment, as illustrated in FIG. 6, the AR glasses 210 described above are provided in a "men" (a kendo protector worn on the head) of kendo protective armor used for kendo, and the force sensing device 214 including a vibration device is provided in a "kote" (kendo armor gloves covering hands).

Furthermore, for example, in the present embodiment as illustrated in FIG. 7, the AR glasses 210 described above are provided in a mask part used for fencing, and the force sensing device 214 including a vibration device is provided in a glove part.

In the present embodiment, as the skill level reduction guidance information for the user A having a high skill level, the AR glasses 210 display a narrower viewing angle for the user A, a shaking floor, a shorter bamboo sword or a fencing sword than actual length, and the like. Furthermore, a message indicating a fake attack (an attack that has not been actually received from an opponent) may be displayed to the user A via the AR glasses 210. Furthermore, in the present embodiment, the force sensing device 214 may apply vibration to the user A during an attack motion or a defense motion. In the present embodiment, since the AR glasses 210 and the force sensing device 214 provide the skill level reduction guidance information to the user A, it is possible to cause erroneous perception of movement or balance by the user A or disturb a body adjustment function. Therefore, in the present embodiment, a lowered skill level of the user A can reduce the skill level difference between the user A and the user B.

In the present embodiment, an attack by the opponent to the user A is estimated, and an estimation is displayed to the user B as the skill level improvement guidance information via the AR glasses 210. Furthermore, in the present embodiment, the user B may be notified of a suitable attack timing via the force sensing device 214 on the basis of the estimation result. As described above, in the present embodiment, since the AR glasses 210 and the force sensing device 214 provide the skill level improvement guidance information to the user B, the user B can improve the skill level. Therefore, in the present embodiment, an improved skill level of the user B can reduce the skill level difference between the user A and the user B.

Note that, in the present embodiment, a force for forcibly making a preferable motion may be applied to the user B or a force for forcibly fixing the motion may be applied to the user A via the force sensing device 214 that is the glove-type wearable device described above.

Furthermore, in the above description, the embodiment of the present disclosure is applied to kendo and fencing, but may also be applied to, for example, boxing. In such a case, as the skill level reduction guidance information for the user A having a high skill level, the AR glasses 210 may provide a display, for example, that makes it difficult to visually recognize punching by the opponent or that makes the gloves of the opponent user B look large. This is not only for lowering the skill level of the user A, but also leading to an improvement in the skill level of the user A since the user A is guided to quickly avoid punching or make a large motion to avoid punching.

3.2 Example 2

Figure 8:
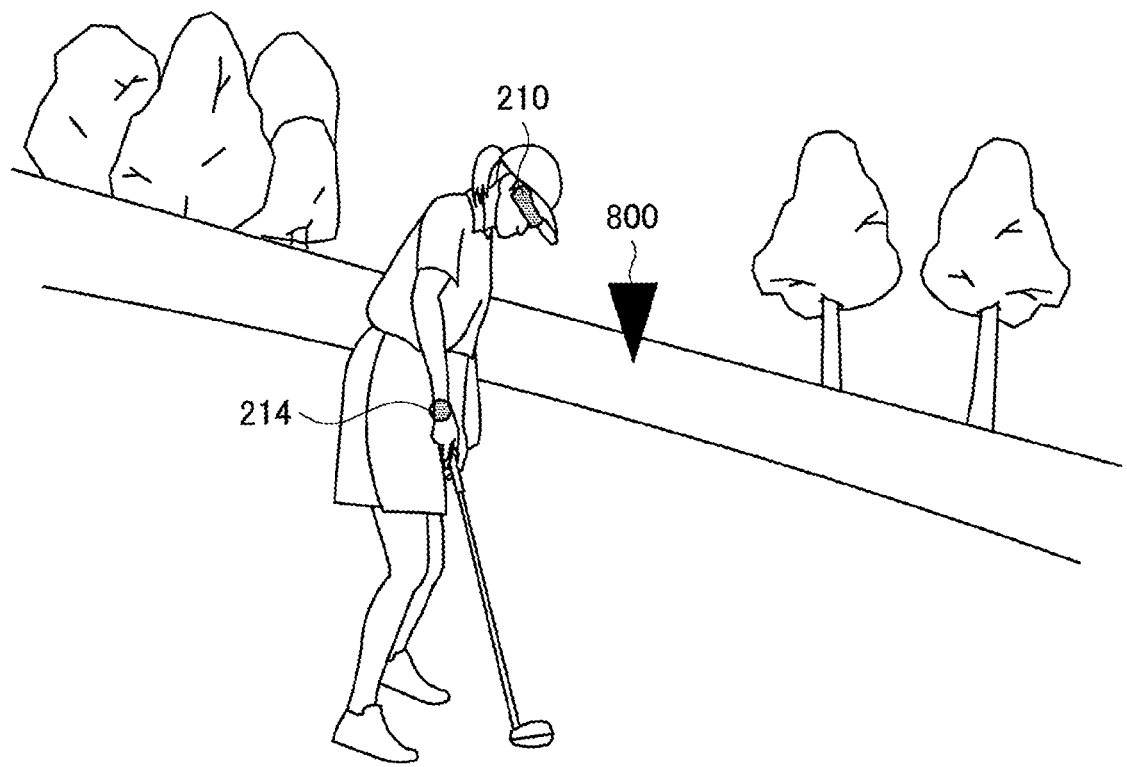
FIG. 8 is an explanatory diagram illustrating Example 2 according to the embodiment.

Next, as Example 2, a case where the above-described embodiment of the present disclosure is applied to golf will be described with reference to FIG. 8. FIG. 8 is an explanatory diagram for explaining Example 2.

For example, in the present example as illustrated in FIG. 8, AR glasses 210 are worn in front of the face of the user, and the force sensing device 214 including the vibration device is worn around the wrist of the user.

In the present example, for the user A having a high skill level, a golf course having undulations different from the actual state is displayed via the AR glasses 210 as the skill level reduction guidance information. In this way, it is possible to cause erroneous perception of movement or balance by the user A to lower the skill level of the user A. Furthermore, in the present example, the force sensing device 214 may apply vibration to the user A at swinging. As a result, it is possible to cause erroneous perception of movement or balance by the user A to lower the skill level of the user A.

Furthermore, in the present example, as the skill level improvement guidance information for the user B having a low skill level, the AR glasses 210 may display detailed information on actual undulations (roughness) of the golf course, information on wind direction and speed, a target point (for example, an indication 800 in FIG. 8), an eyesight position for the user B to see for a suitable swing, and an eyesight position of the user A having a high skill level. Furthermore, in the present example, a suitable swing for flying the ball to the target hole may be estimated, and the estimation result may be provided to the user B as the skill level improvement guidance information. Specifically, in the present example, the user B may be notified of a suitable swing force by vibrating the force sensing device 214. In other words, in the present example, the AR glasses 210 and the force sensing device 214 provide the skill level improvement guidance information to the user B, and thus the user B can improve the skill level.

3.3 Example 3

Figure 9:
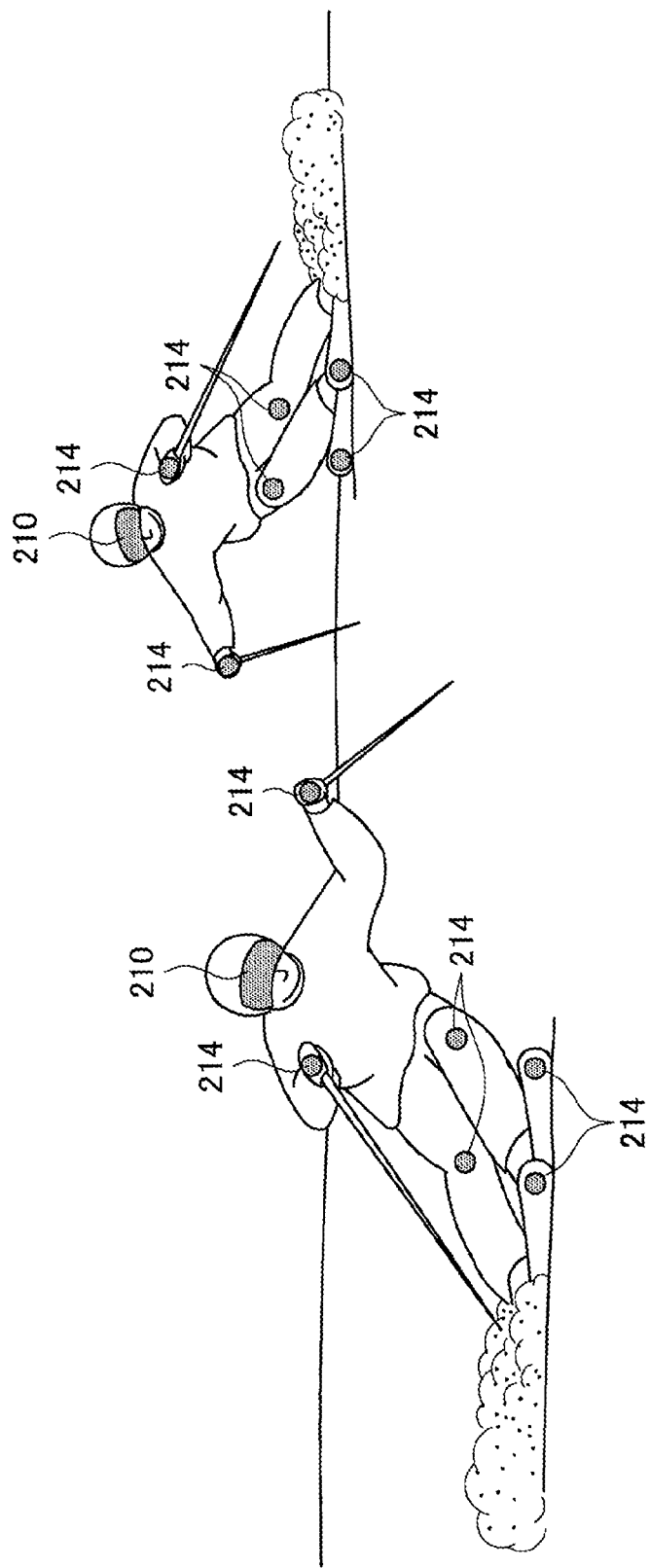
FIG. 9 is an explanatory diagram illustrating Example 3 according to the embodiment.

Next, as Example 3, a case where the above-described embodiment of the present disclosure is applied to skiing (dual time racing) will be described with reference to FIG. 9. FIG. 9 is an explanatory diagram for explaining Example 3.

For example, in the present example as illustrated in FIG. 9, the AR glasses 210 described above are provided on a face part of the helmet placed on the user, and the force sensing device 214 including the vibration device is worn around the wrist and knee joint of the user. Furthermore, in the present example, the force sensing device 214 including the vibration device is also provided on a ski board used by the user.

In the present example, as the skill level reduction guidance information for the user A having a high skill level, the AR glasses 210 display a narrower viewing angle or narrower skiing course to the user A, a course having undulations different from the actual course, a snow surface having bumps with a shape that the user A is not good at, or the like. Furthermore, in the present example, the force sensing device 214 may apply vibration to the skis while the user A is skiing, so as to provide perception of roughness of the snow surface different from the actual snow surface. As a result, it is possible to cause erroneous perception of movement or balance to lower the skill level of the user A. In addition, in the present example, the force sensing device 214 worn on the user A's body may be a stimulation device using electrical muscle stimulation. Such a force sensing device 214 may give an electrical stimulation to the user A to cause erroneous perception of movement or balance by the user A. In the present example, by doing so, not only the skill level of the user A is lowered as an immediate effect, but also improvement of the skill level of the user A, such as improvement of the accuracy of controlling the skis, can be expected in the future by continuously applying a load to the user A during skiing.

Furthermore, in the present example, as the skill level improvement guidance information for the user B having a low skill level, the AR glasses 210 display a course suitable for the user B to take on the snow surface to ski. Furthermore, in the present example, the force sensing device 214 may apply vibration to the skis of the user B during skiing to notify the user B of a skill level difference between the user A and the user B.

3.4 Example 4

Figure 10:
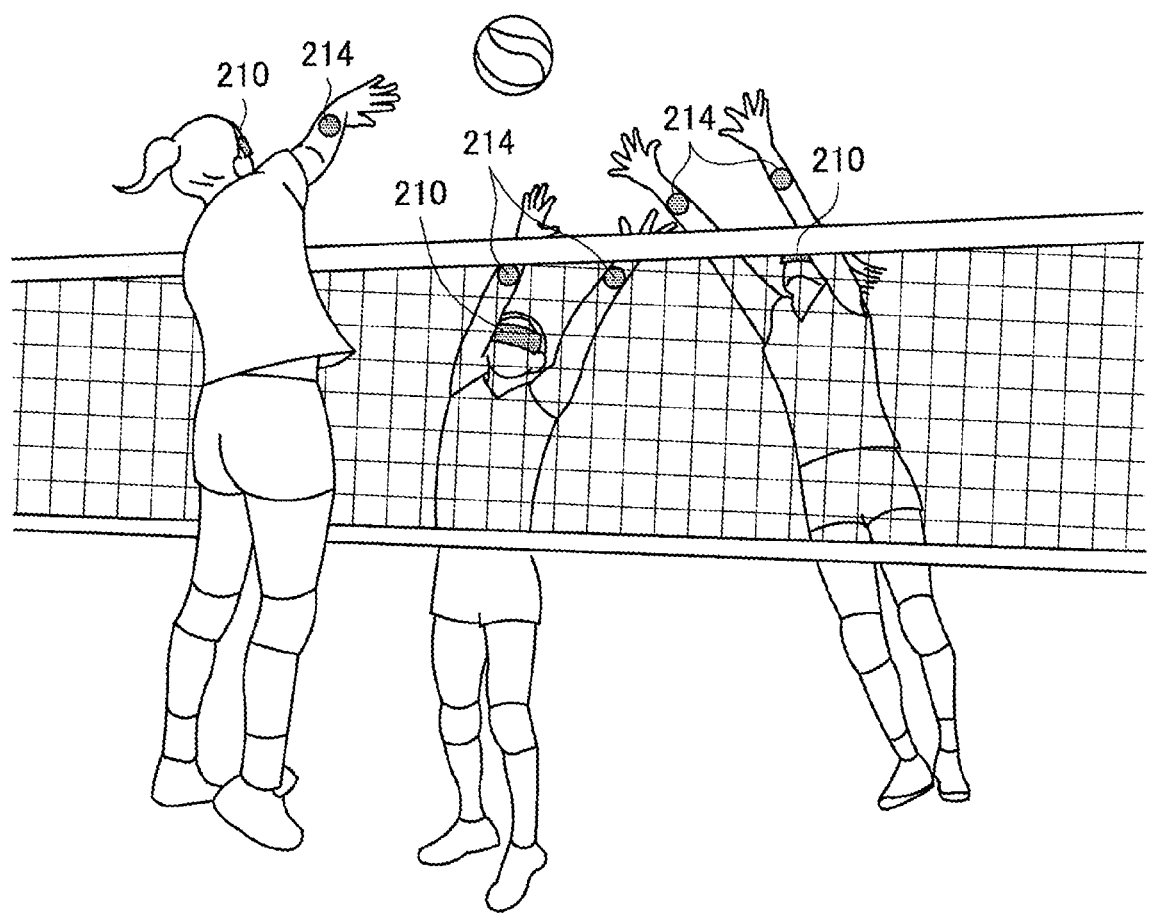
FIG. 10 is an explanatory diagram illustrating Example 4 according to the embodiment.

The examples given so far refer to cases where the present disclosure is applied to one-on-one sports. However, the embodiment of the present disclosure can also be applied to team sports in which a plurality of teams (first group, second group) including a plurality of users (first users, second users) play against each other. Therefore, as Example 4, a case where the above-described embodiment of the present disclosure is applied to volleyball will be described with reference to FIG. 10. FIG. 10 is an explanatory diagram for explaining Example 4.

For example, in the present example as illustrated in FIG. 10, the AR glasses 210 are worn in front of the face of each user, and the force sensing device 214 including the vibration device is worn around the wrist of each user.

In the present example, as the skill level reduction guidance information for the user A having a high skill level or the user A belonging to a team having a high skill level, the AR glasses 210 display a ball having a size (smaller than the actual size), an amplitude (larger than the actual amplitude), and a speed (slower than the actual speed) different from the actual conditions. Furthermore, in the present example, the force sensing device 214 may apply vibration to the user A at the moment of attacking. In the present example, by doing so, it is possible to cause erroneous perception of movement or balance by the user A to lower the skill level of the user A. Furthermore, also in the present example, by doing so, not only the skill level of the user A is lowered as an immediate effect, but also improvement of the skill level of the user A, such as improvement of the accuracy of attacking by hitting the ball center, can be expected in the future by continuously applying a load to the user A while playing.

Furthermore, in the present example, an attack course, a serve course, and the like of a team to which the user A belongs may be estimated. Then, in the present example, the AR glasses 210 may display the estimated attack course, serve course, and the like as the skill level improvement guidance information for the user B having a low skill level or the user B belonging to a team having a low skill level. Furthermore, in the present example, the force sensing device 214 may apply vibration to the wrist of the user B to notify the user B of a block timing.

3.5 Example 5

Figure 11:
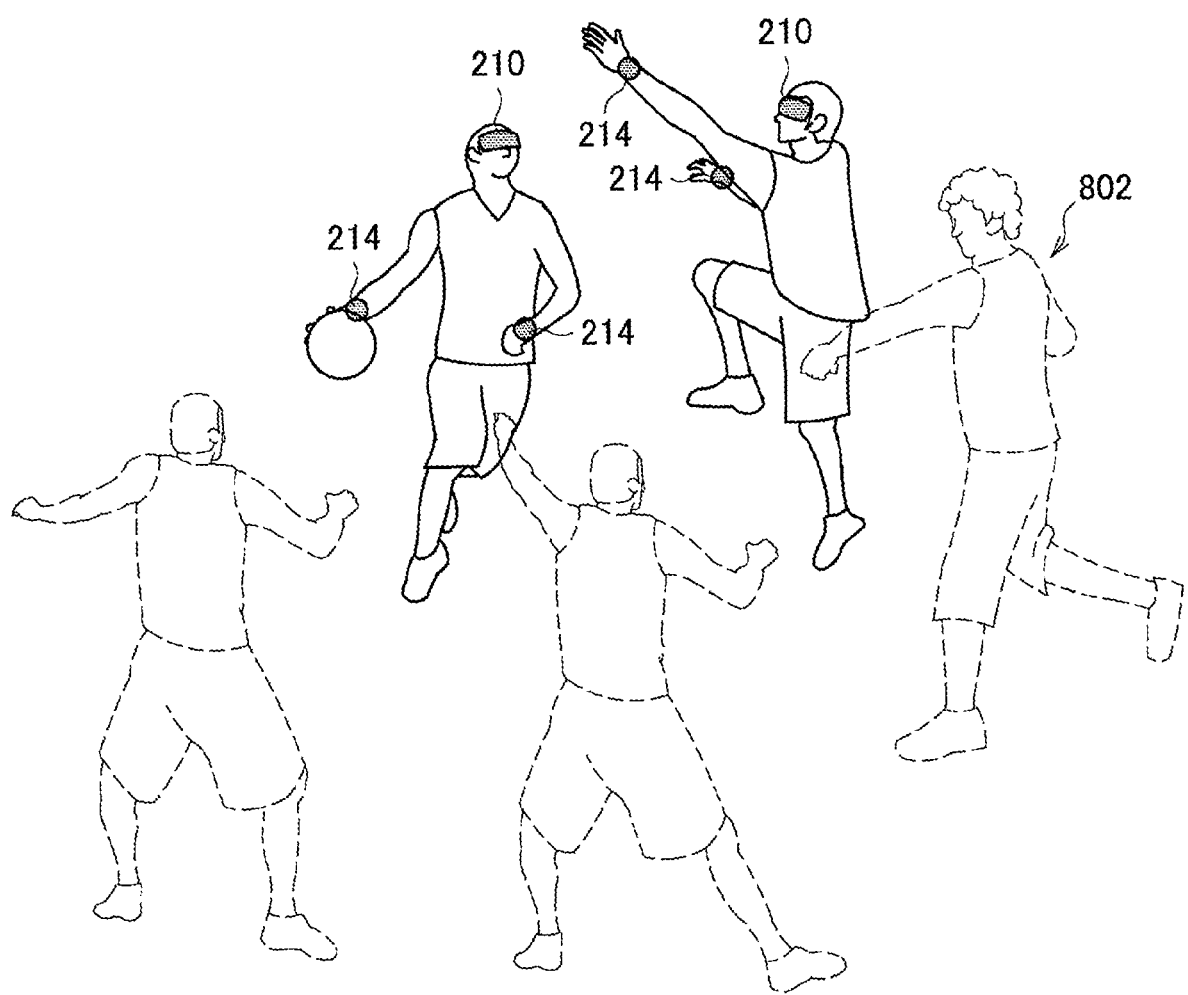
FIG. 11 is an explanatory diagram illustrating Example 5 according to the embodiment.

Next, as Example 5, a case where the above-described embodiment of the present disclosure is applied to basketball will be described with reference to FIG. 11. FIG. 11 is an explanatory diagram for explaining Example 5.

For example, in the present example as illustrated in FIG. 11, the AR glasses 210 are worn in front of the face of the user, and the force sensing device 214 including the vibration device is worn around the wrist of the user.

In the present example, as the skill level reduction guidance information for the user A having a high skill level or the user A belonging to a team having a high skill level, the AR glasses 210 may display a dummy 802 of the opponent at a different position or the number of opponents different from actual conditions. Furthermore, in the present example, the force sensing device 214 may apply vibration to the user A at the moment of dribbling. As a result, it is possible to cause erroneous perception of movement or balance by the user A to lower the skill level of the user A.

In the present example, the position of each user in the team to which the user A belongs may be detected, and the AR glasses 210 may display the detected positions as the skill level improvement guidance information for the user B with a low skill level or the user B belonging to the team with a low skill level. Furthermore, in the present example, the position of each user in the team to which the user B belongs may be detected, and the AR glasses 210 may display the position of the user in a free state to the user B as the skill level improvement guidance information. Furthermore, also in the present example, the force sensing device 214 may apply vibration to the wrist of the user B. By doing so, the user B is notified of a timing to make a pass.

3.6 Example 6

Figure 12:
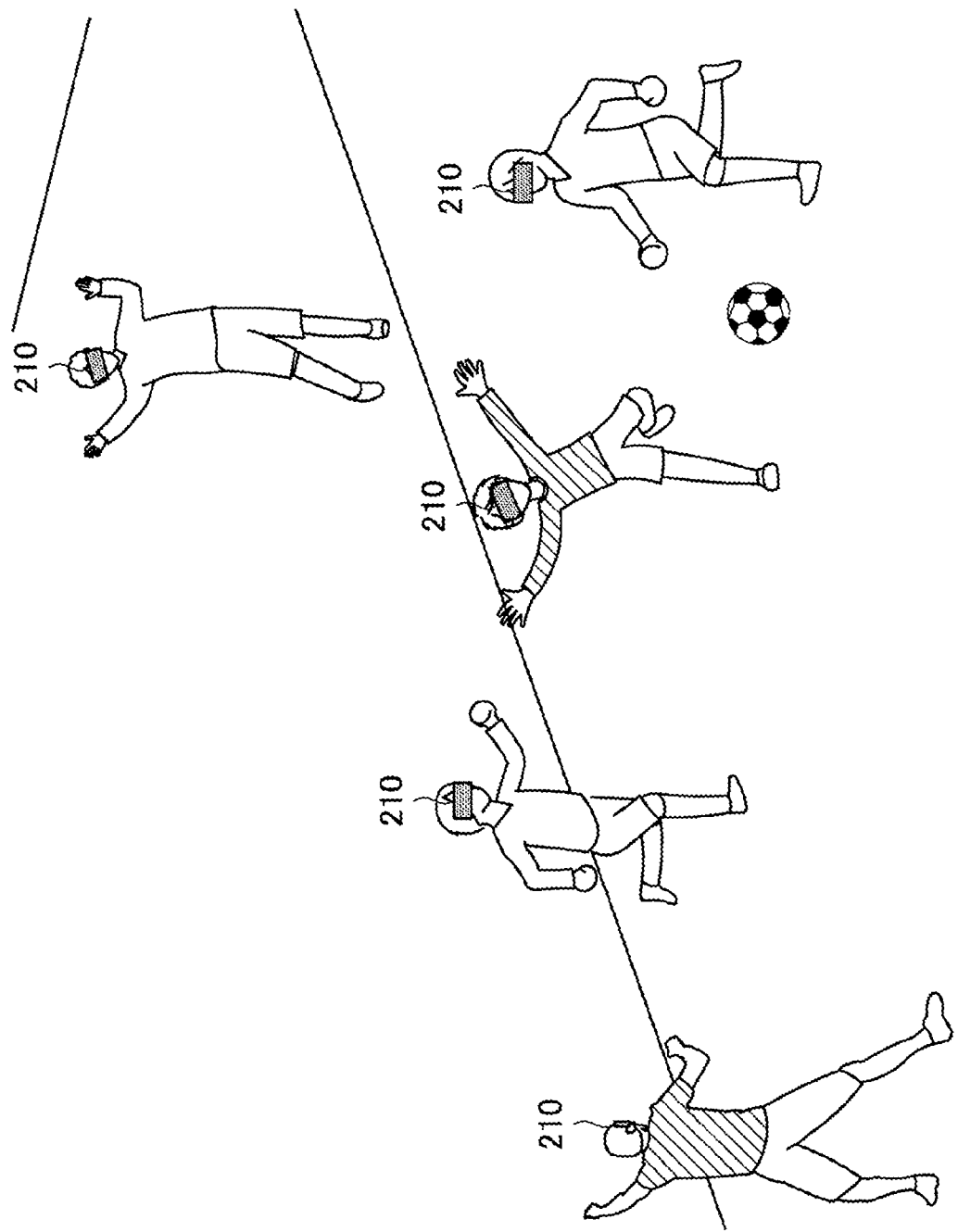
FIG. 12 is an explanatory diagram illustrating Example 6 according to the embodiment.

Next, as Example 6, a case where the above-described embodiment of the present disclosure is applied to soccer will be described with reference to FIGS. 12 and 13. FIG. 12 is an explanatory diagram for explaining Example 6 according to the present embodiment, and FIG. 13 is a sequence diagram for explaining an example of an information processing method of Example 6 according to the present embodiment.

For example, in the present example as illustrated in FIG. 12, AR glasses 210 are worn in front of the face of each user. Although not illustrated in FIG. 12, it is assumed that a positioning sensor is placed on each user.

Next, an information processing method according to the present example will be described with reference to FIG. 13. In the example described below, it is assumed that the user A and the user B belong to a team A having a low skill level, and a user C belongs to a team B having a high skill level. Furthermore, in the following description, a case where the information processing system 10 according to the present embodiment assists the team A in order to improve the skill level of the team A will be described as an example.

Figure 13:
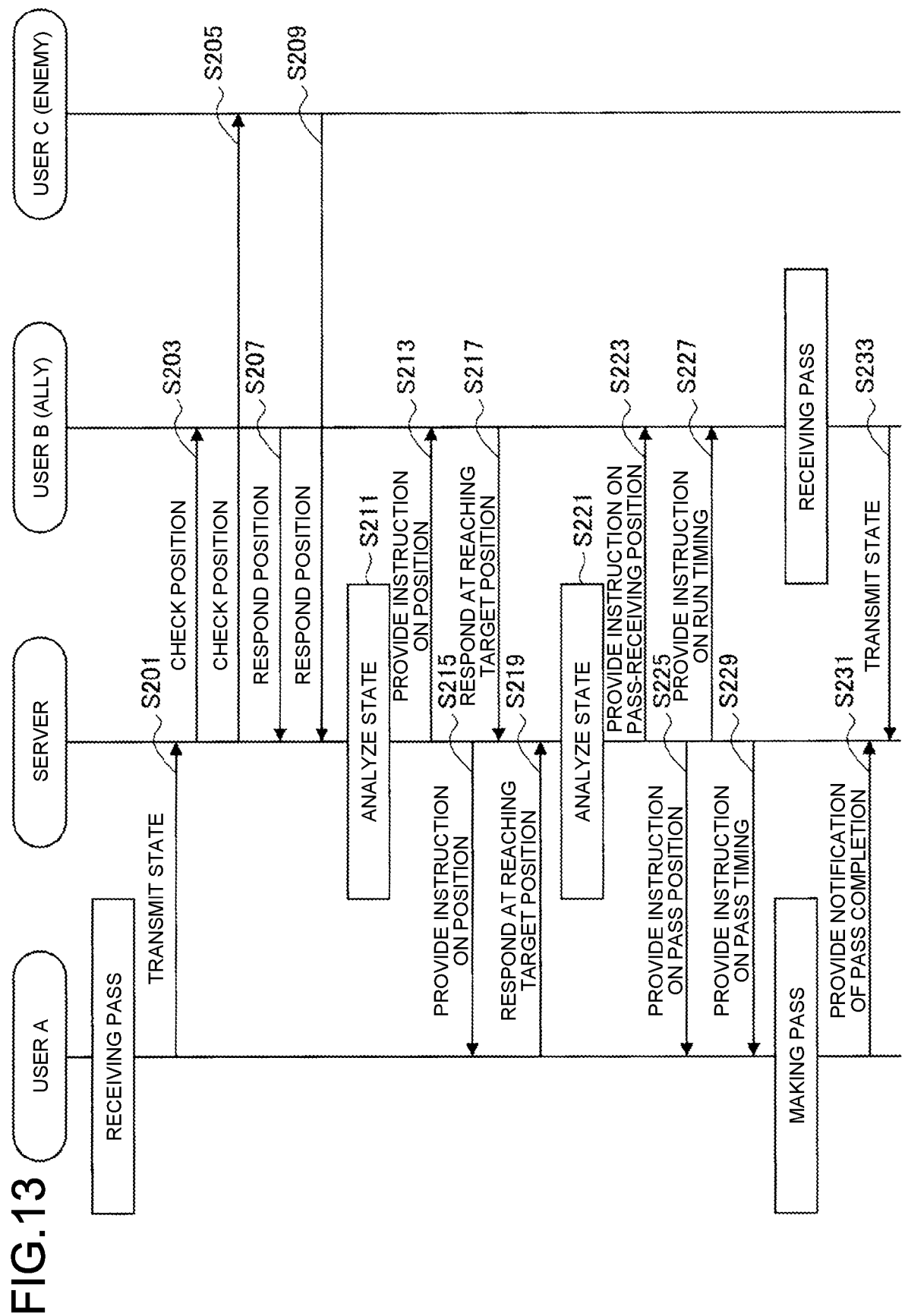
FIG. 13 is a sequence diagram illustrating an example of an information processing method for Example 6 according to the embodiment.

As illustrated in FIG. 13, the information processing method according to the present example includes a plurality of steps from Step S201 to Step S233. Hereinafter, details of each step included in the information processing method according to the present example will be described.

(Step S201)

The motion sensor 206 placed on the user A detects a state that the user A has received a pass, and transmits the state to the server 102. At this time, the positioning sensor (not illustrated) placed on the user A transmits position information of the user A to the server 102.

(Step S203, Step S205)

In order to confirm positions of the user B who is an ally of the user A and the user C who is an enemy of the user A, the server 102 notifies the positioning sensors (not illustrated) placed on the user B and the user C to return the position information (position).

(Step S207, Step S209)

The positioning sensors (not illustrated) placed on the user B and the user C transmit the position information of the user B and the user C as a response to the server 102.

(Step S211)

The server 102 analyzes the state of the game on the basis of the position information of the users A, B, and C, and estimates suitable next positions for the users A and B.

(Step S213, Step S215)

The server 102 transmits, to the AR glasses 210 of the user A and the user B, instruction information that is information on the suitable next positions (target positions) for the user A and the user B on the basis of the estimation result in Step S211 described above.

(Step S217, Step S219)

In a case where each of the positioning sensors (not illustrated) placed on the user A and the user B detects that the user A and the user B have reached the positions transmitted in the above-described Steps S213 and S215, the positioning sensors transmit information indicating that the user A and the user B have reached the positions as a response to the server 102.

(Step S221)

The server 102 analyzes the state of the game on the basis of the position information of the users A and B, and estimates suitable next positions (positions) at which the user A and user B make or receive pass. Furthermore, the server 102 estimates a suitable timing to make a pass or a suitable timing to run to receive a pass by the user A and the user B.

(Step S223, Step S225)

On the basis of the estimation result in Step S221 described above, the server 102 transmits, to the AR glasses 210 of the user A and the user B, the instruction information that is information on the suitable next positions (target positions) for the user A and the user B to make or receive a pass.

(Step S227, Step S229)

The server 102 transmits, to the AR glasses 210 of the user A and the user B, the instruction information that is information on a suitable next timing to make a pass or a suitable timing to run to receive a pass by the user A and user B on the basis of the estimation result in Step S221 described above.

(Step S231)

The motion sensor 206 placed on the user A detects a state that the user A has made a pass and transmits the state to the server 102. At this time, the positioning sensor (not illustrated) placed on the user A transmits position information of the user A to the server 102.

(Step S233)

The motion sensor 206 placed on the user B detects a state that the user B has received a pass, and transmits the state to the server 102. At this time, the positioning sensor (not illustrated) placed on the user B transmits the position information of user B to server 102.

In the present example, by providing the positions of the enemy and the ally, the suitable timing for action, and the like to the users of the team with a low skill level via the AR glasses 210, it is possible to enhance the cooperation between allies and improve the skill level of the users in the team with a low skill level.

Furthermore, in the present example, for users in a team with a high skill level, cooperation in the team may be disturbed by outputting noise (for example, pseudo cheer) through an earphone speaker worn on ears of the users. On the other hand, in the present example, to users of the team with a low skill level, the cooperation in the team may be enhanced by outputting voice of the allies through the earphone speaker worn on ears of the users. At this time, the AR glasses 210 may provide a position of the ally or an eyesight position. By doing so, it becomes easy to recognize a game plan or the like of the team to enhance teamwork.

Furthermore, in the present example, the form of providing information to each user may be dynamically changed, for example, according to the skill level of each user (for example, an advanced motion instruction (a disadvantageous position for receiving a pass, etc.) is provided to the user with a high skill level, and an easy motion instruction is provided to the user with a low skill level.). Furthermore, in the present example, the form of providing information to each user may be dynamically changed, for example, according to an estimation result by estimating remaining physical strength of the user from the endurance (user profile) and an amount of physical activity (sensing data by the motion sensor 206) of each user. Furthermore, in the present example, in a case where a decrease in the physical strength of the user is estimated, the earphone speaker worn on the ears of the user may output support for encouraging the user.

Furthermore, in the present example, in a case where it is estimated to be difficult for the user to visually recognize the display via the AR glasses 210 due to sunlight on the basis of the above-described surrounding environment information, the information may be provided, for example, via the force sensing device 214 including the vibration device placed on the user.

3.7 Example 7

Figure 14:
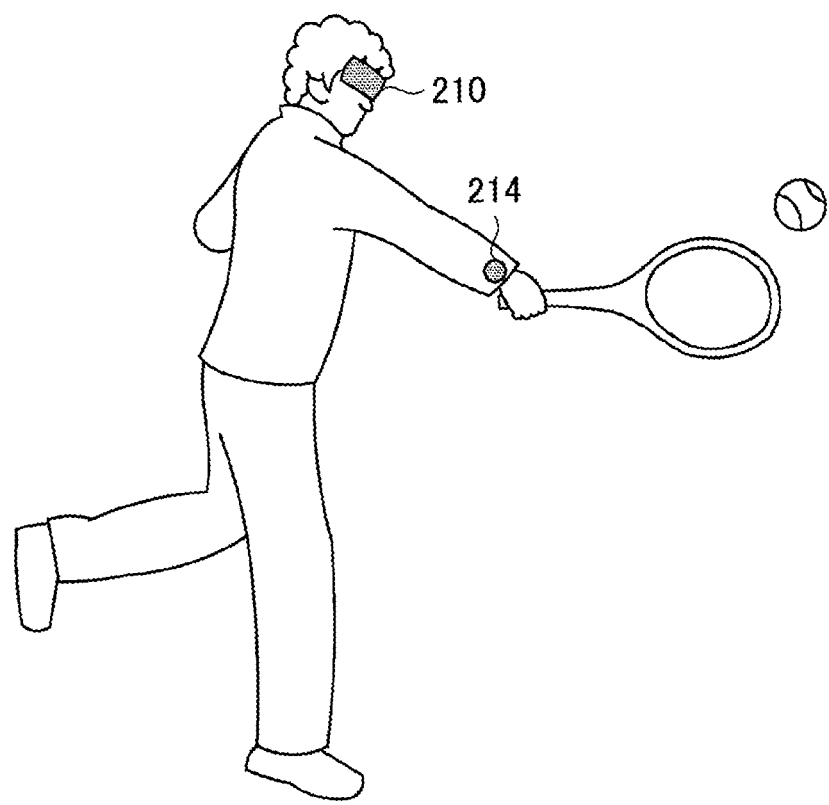
FIG. 14 is an explanatory diagram illustrating Example 7 according to the embodiment.
Figure 15:
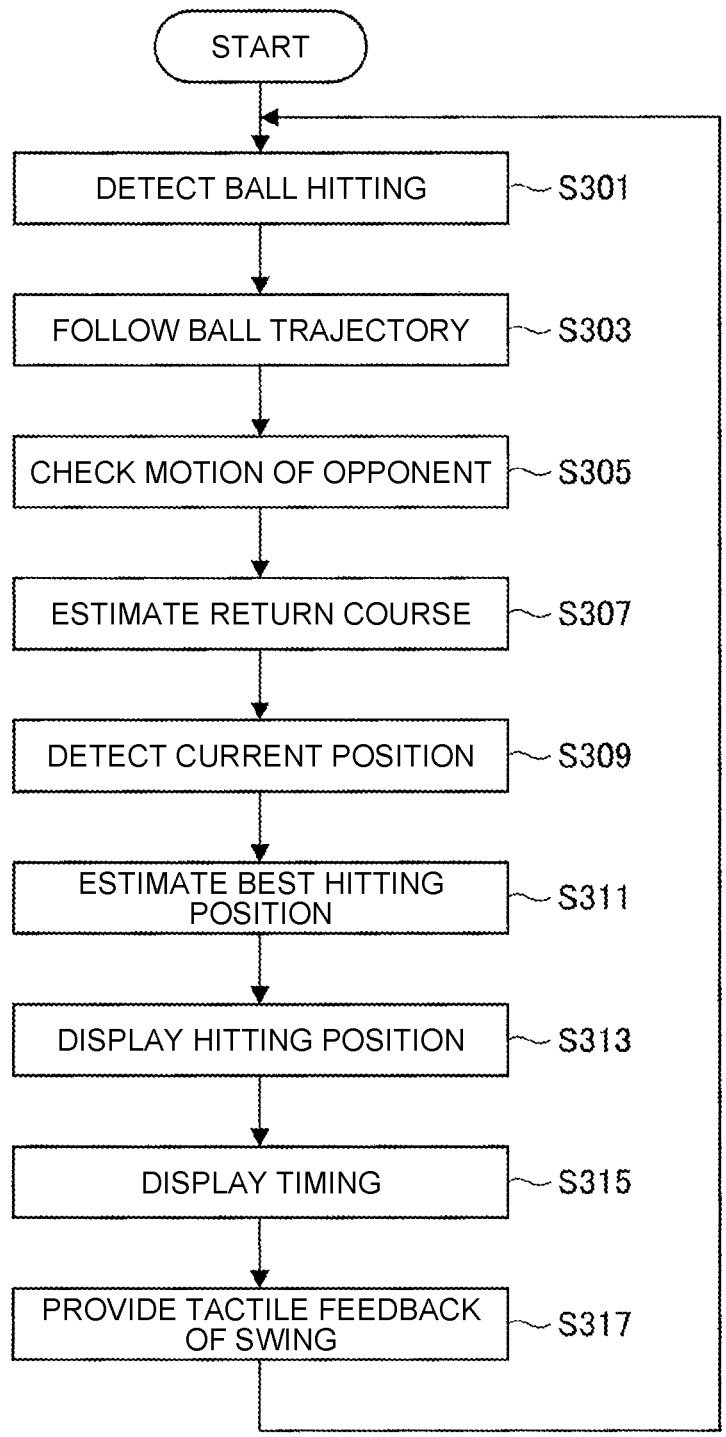
FIG. 15 is a flowchart illustrating an example of an information processing method for Example 7 according to the embodiment.

Next, as Example 7, a case where the above-described embodiment of the present disclosure is applied to tennis and squash will be described with reference to FIGS. 14, 15, 16A, 16B, 16C, 16D, and 17. FIG. 14 is an explanatory diagram for explaining Example 7 according to the present embodiment, and FIG. 15 is a flowchart for explaining an example of an information processing method in Example 7 according to the present embodiment. FIGS. 16A, 16B, 16C, 16D, and 17 are explanatory diagrams illustrating an example of display in Example 7 according to the present embodiment.

For example, in the present example as illustrated in FIG. 14, the AR glasses 210 are worn in front of the face of the user, and the force sensing device 214 including the vibration device are worn around the wrist of the user. Furthermore, although not illustrated in FIG. 14, it is assumed that a motion sensor 206 and the positioning sensor (not illustrated) are placed on the user. Furthermore, in the present example, a racket (tool) used by the user may also be provided with an impact sensor (not illustrated) that detects hitting of the ball.

Next, the information processing method according to the present example will be described with reference to FIG. 15. In the following example, a case where the user A has a skill level lower than that of the user B who is the opponent, and the information processing system 10 according to the present embodiment assists the user A in order to improve the skill level of the user A will be described. As illustrated in FIG. 15, the information processing method according to the present example includes a plurality of steps from Step S301 to Step S317. Hereinafter, details of each step included in the information processing method according to the present example will be described.

(Step S301)

The motion sensor 206 placed on the user A detects a state that the user A has hit a ball with a racket, and transmits the state to the server 102. At this time, the positioning sensor (not illustrated) placed on the user A transmits position information of the user A to the server 102.

(Step S303)

The external camera 108 captures an image of the ball hit by the user A, and the server 102 follows a trajectory of the ball on the basis of the captured image.

(Step S305)

The external camera 108 captures an image of the user B who is an opponent of the user A, and the server 102 detects the position and action (motion) of the user B on the basis of the captured image.

(Step S307)

The server 102 estimates a trajectory (return course) of the ball returned by the user B on the basis of the action of the user B or the like detected in Step S305 described above.

(Step S309)

The positioning sensor (not illustrated) placed on the user A detects a current position of the user A, and transmits the position information of the user A to the server 102.

(Step S311)

On the basis of the return course estimated in Step S307 described above and the position information of the user A detected in Step S309 described above, the server 102 estimates a suitable next position and timing to hit the ball by the user A, and a magnitude of the swing.

(Step S313)

The server 102 displays the next position to hit the ball by the user A on the AR glasses 210 of the user A on the basis of the estimation result in Step S311 described above.

(Step S315)

The server 102 displays a next timing to hit the ball by the user A on the AR glasses 210 of the user A on the basis of the estimation result in Step S311 described above.

(Step S317)

The server 102 provides, to the user A, the magnitude of the next swing by which the user A hits the ball by applying vibration to the wrist by the force sensing device 214 on the basis of the estimation result in Step S311 described above.

Hereinafter, display of specific information to the user A in the present example will be described with reference to FIGS. 16A, 16B, 16C, and 16D.

Figure 16A:
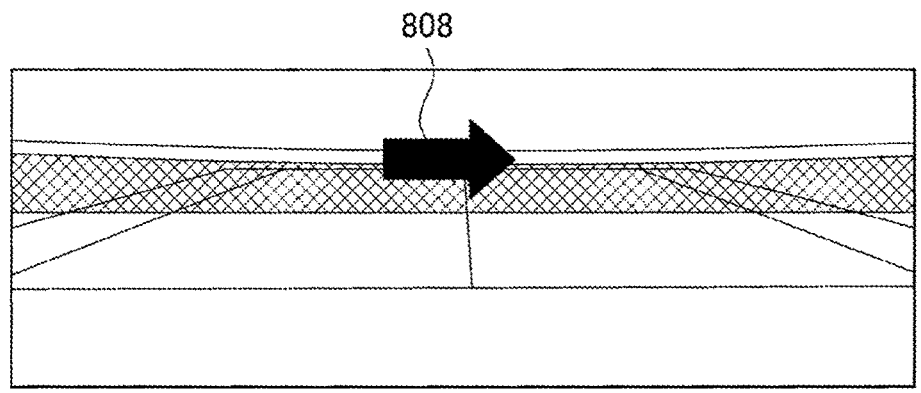
FIGS. 16A, 16B, 16C and 16D are explanatory diagrams (part 1) illustrating an example of display in Example 7 according to the embodiment.

First, in the present example as illustrated in FIG. 16A, to notify the user A of moving to left, right, back, or front, an arrow-like indication 808 may be used immediately before the opponent user B returns the ball. Here, the indication 808 may display a shot type or the like of the returned ball by color, or may display the speed of the returned ball by the length or width of the indication 808.

Figure 16B:
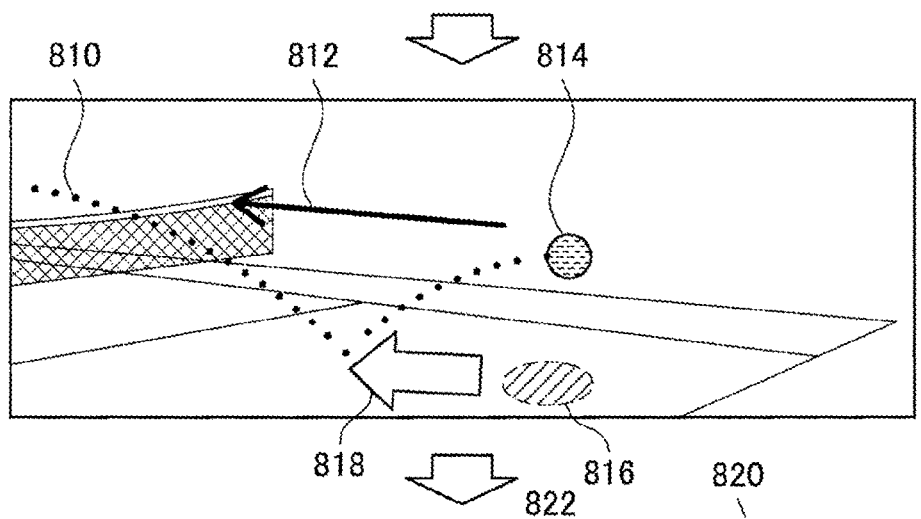

Next, as illustrated in FIG. 16B, a trajectory of the returned ball may be displayed by an indication 810, or a next position to hit the ball by the user A may be displayed by an indication 814. Note that, in the present example, the server 102 may estimate the trajectory of the ball in advance to display falling and passing points of the ball by the indication 810. Furthermore, as illustrated in FIG. 16B, a standing position of the user A may be displayed by an indication 816, and a direction to hit the ball back may be displayed by an arrow-like indication 812.

Figure 16C:
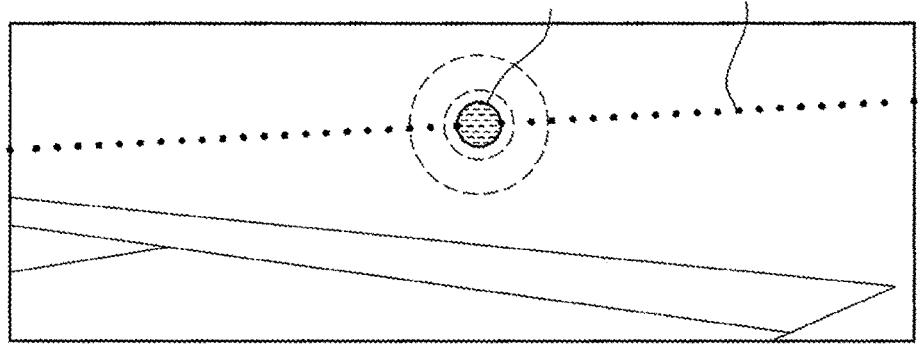

Furthermore, at the timing that the user A returns the ball, the hitting position may be displayed by a highlighted manner as in an indication 822 illustrated in FIG. 16C, or the trajectory of the ball may be displayed by an indication 820.

Figure 16D:
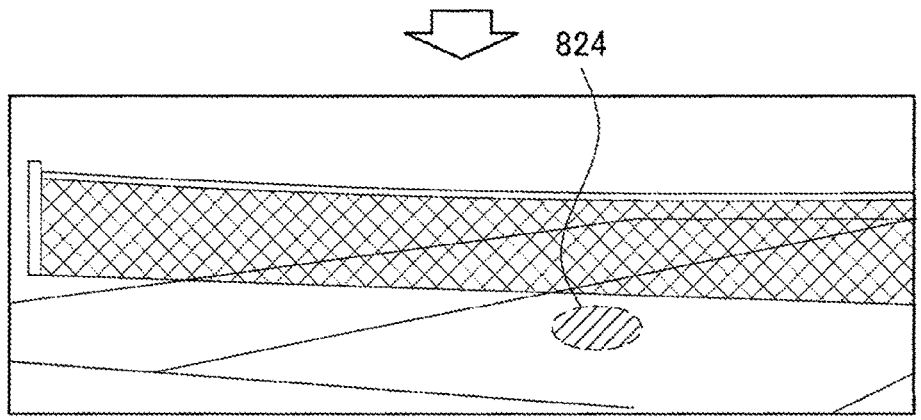

Next, in a case where the user A has finished hitting the ball, a next position for the user A to take may be displayed by an indication 824 as illustrated in FIG. 16D.

In the present example, in a case where the hitting position or the like of the user B who is the opponent can be estimated, the next hitting position of the user A on the basis of the estimation result may be provided together with a countdown for the next timing to hit the ball by the user A. In this way, the user A can easily identify the timing to hit the ball.

Figure 17:
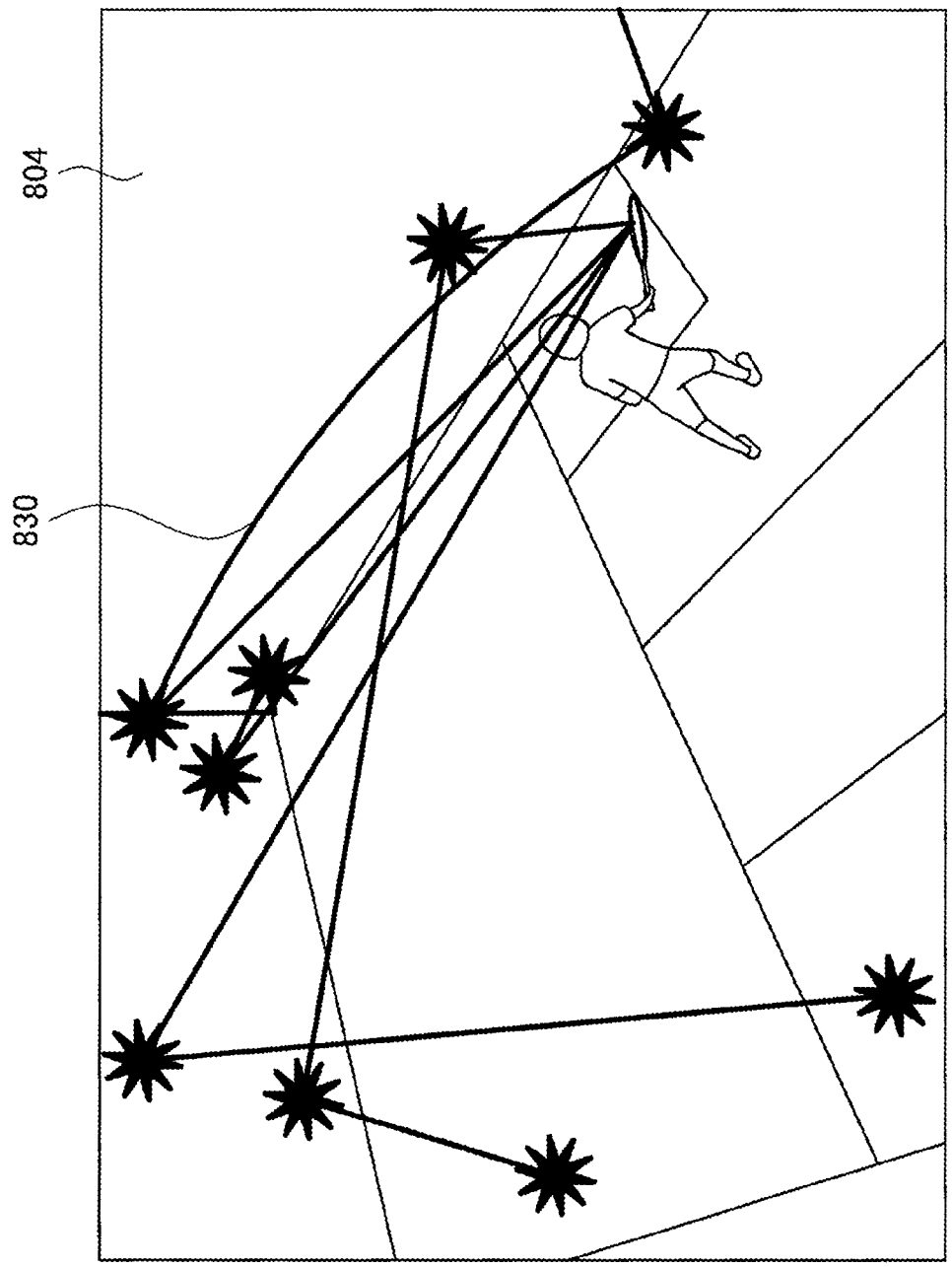
FIG. 17 is an explanatory diagram (part 2) illustrating an example of display in Example 7 according to the embodiment.

Furthermore, in the present example, a pinpoint hitting position may be displayed, or the hitting position may be displayed together with the trajectory as illustrated in FIG. 17. It is preferable to select and display in a mode that the user can easily identify the hitting position.

3.8 Example 8

The embodiment of the present disclosure is not limited to application to sports as described above, and may be applied to, for example, a board game, a card game, and the like.

For example, in a board game or a card game, the AR glasses 210 may display a narrower field of view to the user A having a high skill level to make it difficult to visually recognize a card mark, color, symbol value or type, mark of tile, value, and the like of the cards. In this way, the user A having a high skill level needs to play based on his/her memory. Note that the information hidden by the above display may be dynamically changed according to the state of the game and the skill level of the user, such as only the predetermined number of moves beforehand (from one move to several moves beforehand) or a few moves before or farther (the first move to a few moves beforehand). Furthermore, in the case of a video game, a response speed with respect to the operation of the avatar operated by the user A having a high skill level may be reduced.

Further, in Japanese playing cards such as "Hyakunin-isshu" cards, a poem read by a reader may be heard with a time difference according to the skill level. For example, the user A having a high skill level may hear later than the timing at which the reader actually reads. Furthermore, the number of cards placed in front of the eyes may be limited according to the skill level of the user. For example, the user A with a high skill level sees all the cards, and the user B with a low skill level sees only a few cards including a card corresponding to the card that the reader will read next. In this way, the user B having a low skill level can easily find the right card.

4. SUMMARY

As described above, according to the embodiment of the present disclosure described above, by directly affecting the physical perception of the users to reduce the skill level difference between the users, users having various skill levels can enjoy competing in performance.

Furthermore, in the embodiment of the present disclosure, the AR glasses 210 may display in a color that is more visually recognizable or in a sharper contrast so that a physically challenged person can also enjoy the game. Furthermore, in such a case, in order to make it more difficult for a healthy person to recognize the perception to lower the skill level, the vibration generated by the force sensing device 214 including the vibration device may be weakened, or the sound output from the speaker 212 may be reduced.

5. HARDWARE CONFIGURATION

Figure 18:
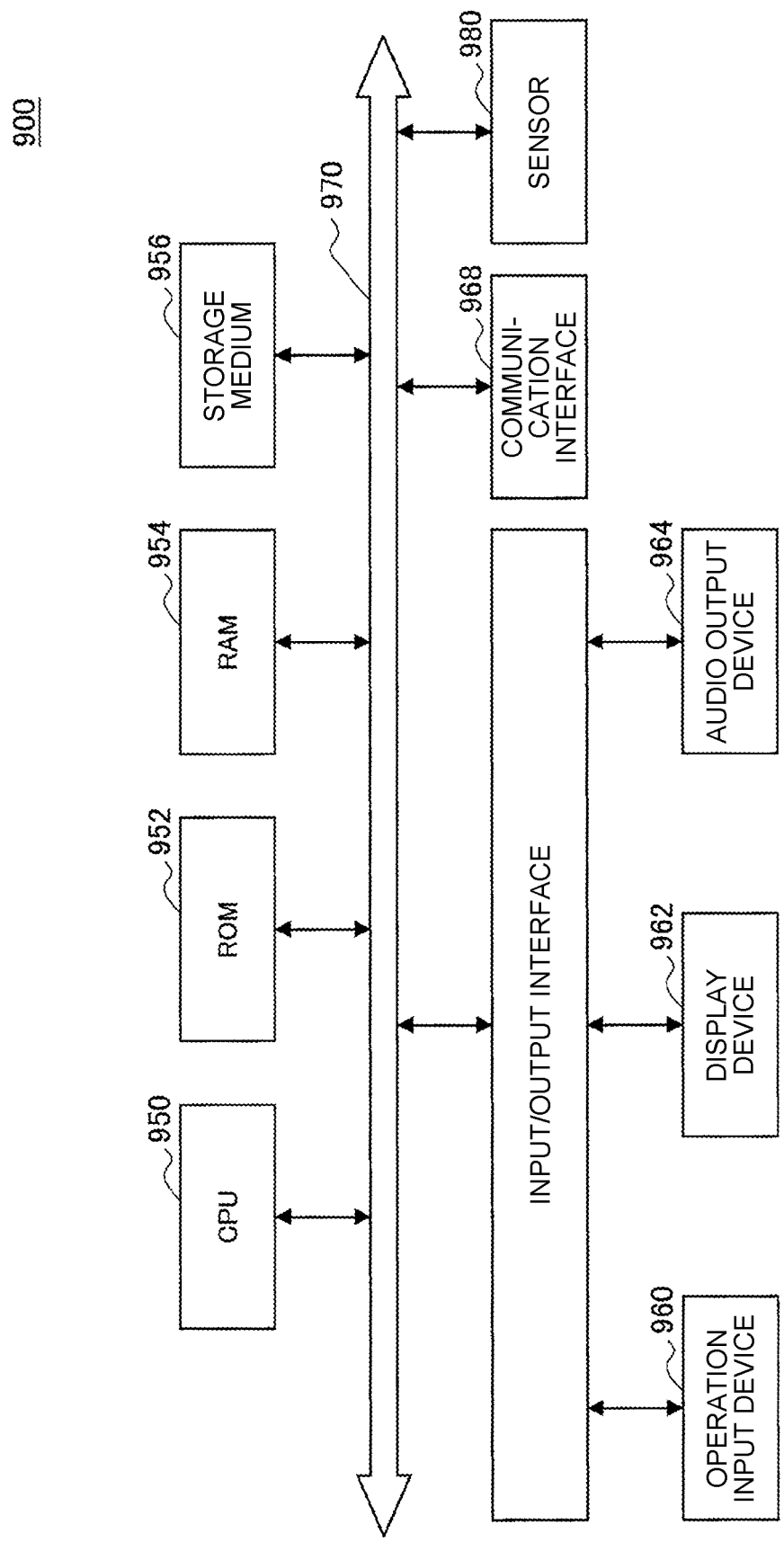
FIG. 18 is an explanatory diagram illustrating an example of a hardware configuration of an information processing apparatus 900 according to the embodiment.

FIG. 18 is an explanatory diagram illustrating an example of a hardware configuration of the information processing apparatus 900 according to the present embodiment. In FIG. 18, the information processing apparatus 900 illustrates an example of the hardware configuration of the server 102 described above.

The information processing apparatus 900 includes, for example, a central processing unit (CPU) 950, a read only memory (ROM) 952, a random access memory (RAM) 954, a recording medium 956, and an input/output interface 958. Furthermore, the information processing apparatus 900 includes an operation input device 960, a display device 962, an audio output device 964, a communication interface 968, and a sensor 980. Furthermore, the information processing apparatus 900 connects the components by, for example, a bus 970 as a data transmission path.

(CPU 950)

The CPU 950 includes, for example, one or more processors including an arithmetic circuit such as a CPU, various processing circuits, and the like, and functions as a main control unit that controls the entire information processing apparatus 900.

(ROM 952 and RAM 954)

The ROM 952 stores programs used by the CPU 950, control data such as calculation parameters, and the like. The RAM 954 temporarily stores, for example, a program executed by the CPU 950. The ROM 952 and the RAM 954 function as, for example, the storage device 110 described above in the information processing apparatus 900.

(Recording Medium 956)

The recording medium 956 functions as the storage device 110 described above, and stores, for example, various data such as data related to the information processing method according to the present embodiment and various applications. Here, examples of the recording medium 956 include a magnetic recording medium such as a hard disk, and a nonvolatile memory such as a flash memory. Furthermore, the recording medium 956 may be removable from the information processing apparatus 900.

(Input/output Interface 958, Operation Input Device 960, Display Device 962, and Audio Output Device 964)

The input/output interface 958 connects, for example, the operation input device 960, the display device 962, the audio output device 964, and the like. Examples of the input/output interface 958 include a universal serial bus (USB) terminal, a digital visual interface (DVI) terminal, a high-definition multimedia interface (HDMI) (registered trademark) terminal, and various processing circuits.

The operation input device 960 functions as, for example, the above-described data input device 104, and is connected to the input/output interface 958 inside the information processing apparatus 900. Examples of the operation input device 960 include a button, a direction key, a rotary selector such as a jog dial, a touch panel, or a combination thereof.

The display device 962 is provided on the information processing apparatus 900, for example, and is connected to the input/output interface 958 inside the information processing apparatus 900. Examples of the display device 962 include a liquid crystal display, and an organic electroluminescence (EL) display.

The audio output device 964 is provided on the information processing apparatus 900, for example, and is connected to the input/output interface 958 inside the information processing apparatus 900. Examples of the audio output device 964 include a speaker, and a headphone.

Note that it is apparent that the input/output interface 958 can be connected to an external device such as an operation input device (for example, a keyboard, a mouse, etc.) outside the information processing apparatus 900 or an external display device.

(Communication Interface 968)

The communication interface 968 is a communication unit included in the information processing apparatus 900 functioning as a communication unit 360, and functions as a communication unit (not illustrated) for performing wireless or wired communication with an external device via a network (or directly) (not illustrated). Here, examples of the communication interface 968 include a communication antenna and a radio frequency (RF) circuit (wireless communication), an IEEE 802.15.1 port and a transmission/reception circuit (wireless communication), an IEEE 802.11 port and a transmission/reception circuit (wireless communication), and a local area network (LAN) terminal and a transmission/reception circuit (wired communication).

(Sensor Unit 980)

The sensor 980 is a range of sensors and functions as the biological information sensor 204, the motion sensor 206, and the like described above.

Furthermore, for example, the information processing apparatus 900 may not include the communication interface 968 in a case of communicating with an external device or the like via a connected external communication device or in a case of a configuration of performing processing in a standalone manner. Furthermore, the communication interface 968 may have a configuration capable of communicating with one or more external devices by a plurality of communication systems.

Furthermore, the information processing apparatus according to the present embodiment may be applied to a system including a plurality of devices on the premise of connection to a network (or communication between devices), such as cloud computing. In other words, the information processing apparatus according to the present embodiment described above can also be implemented as, for example, an information processing system that performs processing related to the information processing method according to the present embodiment by a plurality of apparatuses.

An example of the hardware configuration of the information processing apparatus 900 has been described above. Each of the above-described components may be configured using a general-purpose component, or may be configured by hardware specialized for the function of each component. Such a configuration can be appropriately changed according to a technical level at the time of implementation.

6. SUPPLEMENT

Note that the embodiment of the present disclosure described above can include, for example, a program for causing a computer to function as the information processing apparatus according to the present embodiment, and a non-transitory tangible medium on which the program is recorded. In addition, the program may be distributed via a communication line (including wireless communication) such as the Internet.

Furthermore, each step of the process of the embodiment of the present disclosure described above may not necessarily be implemented in the described order. For example, each step may be implemented in an appropriately changed order. In addition, each step may be partially implemented in parallel or individually instead of being implemented in time series. Furthermore, the processing method of each step may not necessarily be implemented according to the described method, and may be implemented, for example by another method by another functional unit.

Although the preferred embodiment of the present disclosure has been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

Furthermore, the effects described in the present specification are merely illustrative or exemplary, and are not restrictive. In other words, the technology according to the present disclosure can exhibit other effects obvious to those skilled in the art from the description of the present specification together with or instead of the above effects.

Note that the following configurations also belong to the technical scope of the present disclosure.

(1)

An information processing apparatus comprising:
a skill level difference detection unit configured to detect a skill level difference between a first user and a second user on the basis of sensing data regarding the first user and sensing data regarding the second user having a skill level lower than a skill level of the first user, the sensing data being acquired through at least one of performance performed by moving at least a part of a body of a user and other past performance performed with respect to the performance; and
a presentation unit configured to dynamically change and present, during the performance, skill level difference suppression information that reduces the skill level difference to at least one of the first and second users on the basis of the skill level difference detected.

(2)

The information processing apparatus according to (1), wherein
the skill level difference suppression information includes skill level reduction guidance information that guides the first user to lower the skill level, and
the skill level reduction guidance information is presented to the first user.

(3)

The information processing apparatus according to (1) or (2), wherein
the skill level difference suppression information includes skill level improvement guidance information that guides the second user to improve the skill level, and
the skill level improvement guidance information is presented to the second user.

(4)

The information processing apparatus according to any one of (1) to (3), wherein the skill level difference suppression information is displayed on a display device as visual information.

(5)

The information processing apparatus according to (4), wherein
the display device is a transmissive display, and
the display device superimposes and displays a virtual object as the visual information on a real space.

(6)

The information processing apparatus according to (5), wherein the presentation unit dynamically changes display of the virtual object in accordance with the skill level difference suppression information.

(7)

The information processing apparatus according to (5) or (6), wherein the display device is included in a wearable device that is worn on a head part of at least one of the first and second users.

(8)

The information processing apparatus according to any one of (1) to (7), wherein the skill level difference suppression information is output as auditory information by an audio output device.

(9)

The information processing apparatus according to (8), wherein the audio output device is a wearable device that is worn on a head part of at least one of the first and second users, an implant device inserted into a part of a body of at least one of the first and second users, or a directional speaker that provides sound to at least one of the first and second users.

(10)

The information processing apparatus according to any one of (1) to (9), wherein the skill level difference suppression information is output as force sense information by a force sensing device.

(11)

The information processing apparatus according to (10), wherein
the force sensing device is worn on a part of a body of at least one of the first and second users, or provided on a tool used by at least one of the first and second users.

(12)

The information processing apparatus according to any one of (1) to (11), wherein the sensing data is provided by a motion sensor that detects motions of the first and second users.

(13)
The information processing apparatus according to (12), wherein the motion sensor includes a first imaging device that detects the motions of the first and second users.

(14)
The information processing apparatus according to any one of (1) to (13), wherein the sensing data is provided by a posture sensor that detects postures of the first and second users.

(15)
The information processing apparatus according to any one of (1) to (13), wherein the sensing data is provided by a biological information sensor that detects biological information of the first and second users.

(16)
The information processing apparatus according to (15), wherein the biological information sensor includes a second imaging device that detects eye movements of the first and second users.

(17)
The information processing apparatus according to any one of (1) to (16), wherein the sensing data is provided by a position sensor that detects position information of the first and second users.

(18)
The information processing apparatus according to any one of (1) to (17), wherein the sensing data includes at least one of profile information of the first and second users and information regarding a surrounding environment of the first and second users.

(19)
An information processing apparatus comprising:
a skill level difference detection unit configured to detect a skill level difference between a first group and a second group on the basis of sensing data regarding the first group including a plurality of first users and sensing data regarding the second group including a plurality of second users and having a skill level lower than a skill level of the first group, the sensing data being acquired through at least one of performance performed by moving at least a part of a body of a user and other past performance performed with respect to the performance; and
a presentation unit configured to dynamically change and present, during the performance, skill level difference suppression information that reduces the skill level difference to at least one of the first and second groups on the basis of the skill level difference detected.

(20)
An information processing system comprising:
a skill level difference detection apparatus configured to detect a skill level difference between a first user and a second user on the basis of sensing data regarding the first user and sensing data regarding the second user having a skill level lower than a skill level of the first user, the sensing data being acquired through at least one of performance performed by moving at least a part of a body of a user and other past performance performed with respect to the performance; and
a presentation apparatus configured to dynamically change and present, during the performance, skill level difference suppression information that reduces the skill level difference to at least one of the first and second users on the basis of the skill level difference detected.

REFERENCE SIGNS LIST

10 INFORMATION PROCESSING SYSTEM
100 SERVER UNIT
102 SERVER
104 DATA INPUT DEVICE
106 WEATHER OBSERVATION DEVICE
108 EXTERNAL CAMERA
110 STORAGE DEVICE
112, 222 WIRELESS MODULE
120, 240 DATA ACQUISITION UNIT
122 SKILL LEVEL ESTIMATION UNIT
124 SKILL LEVEL DIFFERENCE DETECTION UNIT
126, 242 OUTPUT CONTROL UNIT
200 USER UNIT
202 PROCESSING MODULE
204 BIOLOGICAL INFORMATION SENSOR
206 MOTION SENSOR
208 MICROPHONE
210 AR GLASSES
212 SPEAKER
214 FORCE SENSING DEVICE
230 DISPLAY UNIT
232 OUTWARD CAMERA
800, 808, 810,812, 814, 816, 818, 820, 822, 824, 830 INDICATION
802 DUMMY
804 DISPLAY SCREEN
900 INFORMATION PROCESSING APPARATUS
950 CPU
952 ROM
954 RAM
956 RECORDING MEDIUM
958 INPUT/OUTPUT INTERFACE
960 OPERATION INPUT DEVICE
962 DISPLAY DEVICE
964 AUDIO OUTPUT DEVICE
968 COMMUNICATION INTERFACE
970 BUS
980 SENSOR

The invention claimed is:
1. An information processing apparatus, comprising:
a central processing unit (CPU) configured to:
receive first sensing data from a motion sensor based on a performance of a first user,
wherein the performance of the first user is based on a movement of at least a part of a body of the first user;
receive second sensing data from the motion sensor based on a performance of a second user,
wherein the performance of the second user is based on a movement of at least a part of a body of the second user;
detect a difference between a skill level of the first user and a skill level of the second user based on the received first sensing data and the received second sensing data,
wherein the skill level of the first user is higher than the skill level of the second user;
dynamically change, during the performance of the first user and the performance of the second user, skill level difference suppression information based on the detected difference,
wherein the skill level difference suppression information includes skill level reduction guidance information that guides the first user to lower the skill level of the first user; and
control a first display device of the first user to display the skill level difference suppression information.

2. The information processing apparatus according to claim 1, wherein
the skill level difference suppression information further includes skill level improvement guidance information that guides the second user to improve the skill level of the second user, and
the CPU is further configured to control a second display device of the second user to display the skill level improvement guidance information.

3. The information processing apparatus according to claim 1, wherein
at least one of the first display device or a second display device of the second user is a transmissive display, and
the CPU is further configured to control one of the first display device or the second display device to superimpose and display a virtual object as the skill level difference suppression information on a real space.

4. The information processing apparatus according to claim 3, wherein the CPU is further configured to:
dynamically change the virtual object based on the skill level difference suppression information; and
control the one of the first display device or the second display device to display the dynamically changed virtual object.

5. The information processing apparatus according to claim 3, wherein
the first display device is included in a first wearable device wearable on a head part of the first user, and
the second display device is included in a second wearable device wearable on a head part of the second user.

6. The information processing apparatus according to claim 1, wherein the motion sensor detects motions of the first user and the second user.

7. The information processing apparatus according to claim 6, wherein the motion sensor includes a first imaging device that detects the motions of the first user and the second user.

8. The information processing apparatus according to claim 1, wherein
the first sensing data includes at least one of profile information of the first user or information of a surrounding environment of the first user, and
the second sensing data includes at least one of profile information of the second user or information of a surrounding environment of the second user.

9. An information processing apparatus, comprising:
a central processing unit (CPU) configured to:
receive, from a motion sensor, first sensing data of a first group including a first plurality of users, wherein
the first sensing data is based on a performance of a first user of the first plurality of users, and
the performance of the first user is based on a movement of at least a part of a body of the first user;
receive, from the motion sensor, second sensing data of a second group including a second plurality of users, wherein
the second sensing data is based on a performance of a second user of the second plurality of users, and
the performance of the second user is based on a movement of at least a part of a body of the second user:
detect a difference between a skill level of the first group and a skill level of the second group based on the received first sensing data and the received second sensing data,
wherein the skill level of the first group is higher than the skill level of the second group;
dynamically change, during the performance of the first user and the performance of the second user, skill level difference suppression information based on the detected difference,
wherein the skill level difference suppression information includes skill level reduction guidance information that guides the first group to lower the skill level of the first group; and
control a display device of the first user to display the skill level difference suppression information.

10. An information processing system, comprising:
a motion sensor configured to:
detect a motion of a first user to output first sensing data; and
detect a motion of a second user to output second sensing data; and
a central processing unit (CPU) configured to:
receive the first sensing data from the motion sensor based on a performance of the first user,
wherein the performance of the first user is based on the motion of the first user;
receive the second sensing data from the motion sensor based on a performance of the second user,
wherein the performance of the second user is based on the motion of the second user;
detect a difference between a skill level of the first user and a skill level of the second user based on the received first sensing data and the received second sensing data,
wherein the skill level of the first user is higher than the skill level of the second user;
dynamically change, during the performance of the first user and the performance of the second user, skill level difference suppression information based on the detected difference,
wherein the skill level difference suppression information includes skill level reduction guidance information that guides the first user to lower the skill level of the first user; and
control a display device of the first user to display the skill level difference suppression information.

* * * * *